United States Patent [19]

Janu et al.

[11] Patent Number: 4,794,314
[45] Date of Patent: Dec. 27, 1988

[54] ENVIRONMENTAL POSITION ACTUATOR APPARATUS HAVING LOAD RESPONSIVE LIMIT CONTROL APPARATUS

[75] Inventors: George J. Janu, Brookfield; Raymond D. Feller, Franklin; Richard N. Laakaniemi, Hales Corners, all of Wis.

[73] Assignee: Johnson Service Company, Milwaukee, Wis.

[21] Appl. No.: 90,796

[22] Filed: Aug. 28, 1987

[51] Int. Cl.⁴ ............................................. G05B 19/40
[52] U.S. Cl. ............................. 318/685; 251/129.01; 251/129.12; 251/286; 137/247
[58] Field of Search ...................... 318/685, 282, 475; 137/247; 251/129.2, 129.12, 129.01, 129.04, 129.11, 129.13, 284, 286, 288, 231; 200/61.86; 116/277

[56] References Cited

U.S. PATENT DOCUMENTS

| | | | |
|---|---|---|---|
| 1,974,335 | 9/1934 | Kimball | 137/139 |
| 2,407,537 | 9/1946 | Chapman | 192/142 |
| 2,598,062 | 5/1952 | Krecan | 137/724 |
| 2,763,797 | 9/1956 | Dean | 310/68 |
| 3,219,902 | 11/1965 | Sibley | 318/475 |
| 3,430,916 | 3/1969 | Raymond, Jr. | 251/71 |
| 3,460,018 | 8/1969 | Cary | 318/475 |
| 4,114,078 | 9/1978 | Malinski et al. | 318/475 |
| 4,134,052 | 1/1979 | Wanlass et al. | 318/282 |
| 4,265,270 | 5/1981 | Satoh | 137/505 |
| 4,388,575 | 6/1983 | Lungu | 318/475 |
| 4,595,081 | 6/1986 | Parsons | 185/40 |
| 4,621,789 | 11/1986 | Fukamachi | 251/129 |

Primary Examiner—William M. Shoop, Jr.
Assistant Examiner—Brian Young
Attorney, Agent, or Firm—Andrus, Sceales, Starke & Sawall

[57] ABSTRACT

A position actuator includes a motor driven low efficiency lead screw with a follower moving in parallel relation to a valve coupler of a valve shaft and a switch operator of a force/torque limit unit. A lever is pivotally coupled to the follower, coupler and the operator. The lever pivots about the operator to move the valve coupler at a valve limit. The coupler cannot move and the lever pivots about the coupler to move the operator and actuates a switch to signal an alarm and/or another controller. The limit unit includes an elongated coil spring having a low spring rate within a tubular housing having mounting plates for switches. The operator passes through the spring and has retainers abutting the spring ends and the housing to provide a factory spring calibration. The lever couplings include a lever opening with spaced knife-edges to provide low friction engagement. In a damper control, limit unit is mounted to a driven sector gear and a lever is secured to a damper shaft. At limit condition, the shaft cannot move and sector gear movement moves the operator to actuate the switch. A linear actuator may be connected directly to the operator for in-line movement. The limit unit provides precise identification of the actuator movement and may provide end limit signals for initializing a stepper motor control and/or a constant speed motor control.

36 Claims, 6 Drawing Sheets

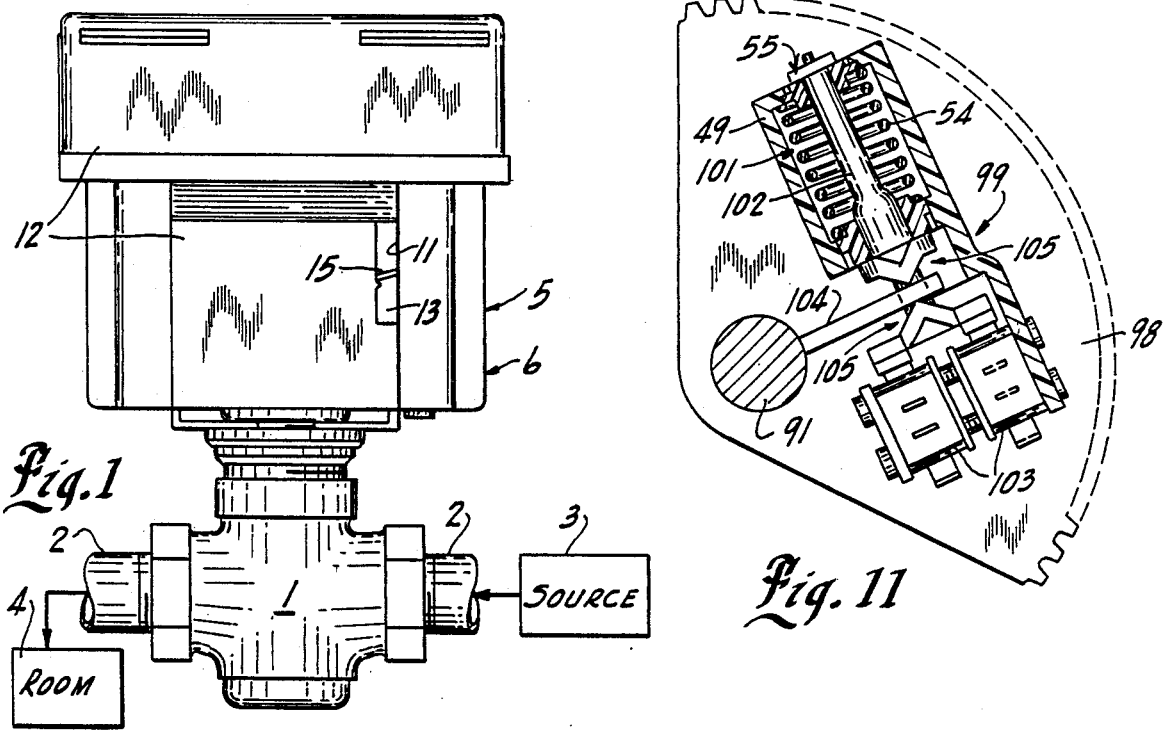
Fig. 1
Fig. 11
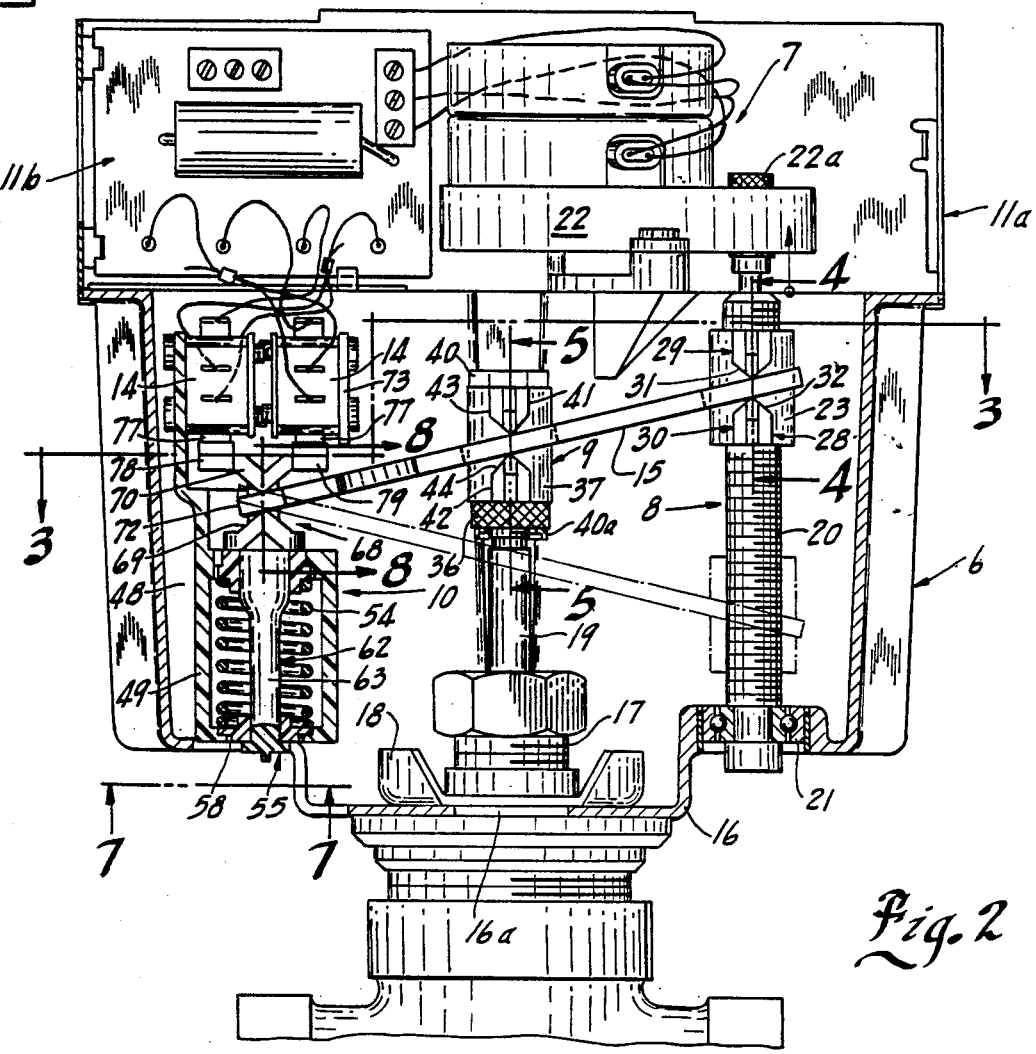
Fig. 2

ENVIRONMENTAL POSITION ACTUATOR APPARATUS HAVING LOAD RESPONSIVE LIMIT CONTROL APPARATUS

BACKGROUND OF THE PRESENT INVENTION

The present invention relates to a position actuator apparatus for environmental control devices such as valves, dampers and like control devices, and particularly such an actuator apparatus having a load responsive limit device for protecting the actuator and controlled device against abnormal force conditions which could cause damage, and more particularly to such an actuator apparatus having a force/torque limit device for signaling the presence of a load on the actuator and control device within predetermined limits regardless of dimensional variations within tolerances or dimensional changes of the parts over the life of the unit, such as rubber, seals, and with such predetermined limits provided in both directions, and further adapted to permit establishing of an open loop position control system.

The movement of mechanical devices such as valves, dampers and like flow control devices used in environmental air control system is provided through various drive units including pneumatic, hydraulic and electric driven actuators. Electric motor driven systems are well known for both large and relatively small load applications, such as positioning actuators in heating, ventilating and air conditioning systems, generally referred to as HVAC systems. HVAC systems use different cooling or heating mediums such as air and water with flow control valves, dampers and the like connected into the system for controlling and regulating the flow of the medium in response to various demand signals. Electric motor driven actuators are well known and widely used in HVAC systems The motors can be relatively small A.C. motors coupled to the valves or dampers through a mechanical force amplifying unit such as gears, lead screws or the like to match the drive force to the load.

The use of a small motor in combination with a load related gear or linkage provides a highly cost effective design for various sized loads. A single motor and an electronic control can also be readily adapted to various sized valve and damper specifications. A.C. synchronous motors and stepper motors provide a particularly satisfactory prime mover for HVAC systems because such motors can be used in either a closed loop or an open loop control system. In HVAC systems, the specifications as to positioning of the flow control device are relatively rigorous and demanding. The valve, damper and like devices as well as the motor will be damaged if over driven beyond the fully open and fully closed positions, or if some obstruction or mechanical failure prevents movement, with maximum motor driven force applied. The motor must provide a sufficient force or torque to overcome the load of the valve and/or damper, the interconnecting drive coupling mechanism and the load on the positioned device. Thus, the motor must also overcome any static forces created by the liquid or gas with the medium flowing through or applied to the positioned device. Generally, if maintained on the positioned device at its limit may significantly damage the motor, coupling or positioned device.

Generally, the prior art has provided various limit sensing devices for de-energizing of the motor with the positioned device at a limit position, or under an obstruction malfunction in a intermediate position.

The use of limit switches actuated at the opposite ends of the opening and closing of the positioned device requires careful and accurate positioning of the limit switches, with proper field calibration. An alternative control which tends to eliminate the disadvantage of position sensitive limit switches includes a force reaction device connected to the system wherein the load on the positioned device is monitored and in the event of abnormal force loading of the drive system, a switch is actuated and a signal is generated which is preferably connected to remove the power supply directly or indirectly from the motor. Such systems will respond to the loading of the drive mechanism in the intermediate position as well as the end positions and may be constructed with a fail-inposition system or with a return or reset to reference position system which can function as a fail safe control in selected applications. The drive mechanism can be constructed with a sufficient loading such as to hold the positioned device in its last position upon de-energization of the motor. Alternatively, the positioned device is readily provided with a reset spring unit which is loaded during movement from a reference position and returns the device to such reference on de-energization of the motor. The referencing position is usually either a fully closed or fully opened position, depending upon the particular required specifications. For example, in a winter heating system, a valve unit would generally be returned to a full haat position rather than a shut down position in order to prevent complete loss of heat during a cold condition.

The preventing of continued energization of the motor under limit load conditions is a highly significant requirement in HVAC systems and the like. Significant and expensive damage to costly components such as the motors, valves, dampers and the like will rapidly develop if the motor continues to operate at the limit positions and the like. Various force responsive systems have been suggested in the prior art. Typically, such systems are shown in U. S. Patents as follows:

| U.S. Pat. No. | Issue Date |
| --- | --- |
| 1,974,335 | 09-18-1934 |
| 2,407,537 | 09-10-1946 |
| 2,598,062 | 05-27-1952 |
| 2,763,797 | 09-18-1956 |
| 3,219,902 | 11-23-1965 |
| 3,430,916 | 03-04-1969 |
| 3,460,018 | 08-05-1959 |
| 4,114,078 | 09-12-1978 |
| 4,134,052 | 01-09-1979 |
| 4,265,270 | 05-05-1981 |
| 4,388,575 | 06-14-1983 |
| 4,595,081 | 06-17-1986 |
| 4,621,789 | 11-11-1986 |

U.S. Pat. No. 2,763,797 which was issued on Sept. 18, 1965 discloses a system in which a preloaded spring unit is coupled in the drive train to actuate limit switches at the limit of the positioner An A.C. motor is coupled to drive a hollow shaft having a splined coupling to an output shaft. A worm on the output shaft is coupled to a worm gear for positioning of a valve, damper or the like. The output shaft is mounted for relative axial movement through the motor shaft, with a spring coupling permitting limited axial movement therebetween. The output shaft extends from the motor shaft, with an axially adjustable disk located between axially spaced limit switch units. The switch units are mounted in spaced relation to each other and to the opposite sides of the disk. Under normal operating conditions, the spring holds the output shaft in alignment within the hollow motor shaft to provide for simultaneous rotation of the worm and worm gear. If the worm gear is prevented from rotating, such as at the end of the position of a valve or damper, rotation of the worm creates a load back through the output shaft to the motor shaft and thus directly onto the motor. When the force is greater than the spring force, the worm rides on the fixed worm gear resulting in a movement of the output shaft against the force of the coupling spring. The result is movement of the output shaft and the switch disk secured thereto. Selected movement of the disk results in engagement with one of the switches which then deenergizes the motor. In such a system, the shaft and switch operating disk must move a predetermined amount directly related to the final drive coupling of the worm and worm gear in order to actuate the switches. Further, the switches as shown are separately and individually mounted much in the nature of limit switches. If a particular cutoff point is desired, field calibration may be required, whereas the device of the present invention has a cutoff point which eleminates field calibration. The elongated shaft connection of the worm and worm gear drive may introduce a certain degree of lost motion and varying tolerances, particularly with extended periods of use, may prevent repeatable and pinpoint response over the normal life of the system. Finally, the device is specifically constructed with the rotating worm and worm gear integrated telescoped shafts and is particularly applicable to spun-gear rotary devices and linear devices.

The A.C. synchronous motor and the stepper motor are desirable as being readily adapted to an open loop control system in contrast to a closed loop control system. An A.C. synchronous motor operates at a constant speed after initial start up. A.C. synchronous motors are also readily formed with bi-directional outputs by having appropriate forward and reverse run windings. Consequently, the position of the device can be monitored accurately by monitoring of the time and direction of A.C. motor operation. Further, A.C. synchronous motors are commercially mass produced and provide a cost effective source which has a long operating life when operated within load specifications. Relatively high speed, low torque A.C. motors can be used with appropriate load force amplifying gears, screws and the like mechanical connecting mechanisms. The direct position monitoring establishes a convenient open loop control.

Similarly, reversible stepping motors provide for precise movement of the load or positioned device for each step energization and step of the stepper motor. Again, by monitoring the number of steps and the direction of movement between the limit positions, a precise indication of the location of the positioned device is established. This again provides a cnnvenient open loop control system.

Although prior art actuators for HVAC systems include a mulitude of electric motor driven actuators as well as other forms of hydraulic and pneumatic actuators and many actuators are commercially available, the accuracy and reliability provided is often a compromise based on appropriate economic considerations of initial cost, maintenance cost and the like versus the essential or even necessary control requirements. The conflict and need of balancing cost requirements and operating specifications has established a continuing demand and need for a relatively low cost actuator of the force responsive type which meets the rigorous relationship between output displacement of the positioned device and the electrical input control. The demand is thus for a rapidly responding and accurate load responsive actuator which permits cost effective manufacture as by permitting reasonably wide manufacturing tolerances, produces a small, compact unit which can be coupled to the positioned valve, damper or the like in th minimum spaced requirements encountered in HVAC systems, is conveniently applied to different sized loads presented by the different positioned control devices in HVAC systems and can be used with both open and closed loop systems.

Environmental control systems include a sensor to produce a condition signal, such as temperature, to a controller which compares the condition signal with a set point signal and generates a control signal. The control valve or damper actuator is driven in accordance with a control signal. In a floating closed loop control, the control device is driven toward a fully open or fully closed position until the loop signals balance. In an open loop incremental system, the controller calculates the needed change in the control device position related to the difference between the sensor and setpoint signals and positions the control device accordingly. The open loop system is generally useful in applications in which a substantial plurality of different subsystems are controlled with a multiplexing of the subsystems. A third system provides a proportional control in which the position of the control device is continuously linearly positioned in accordance with the demand signal created by the difference in the sensor signal from the setpoint.

SUMMARY OF THE PRESENT INVENTION

The present invention is particularly directed to an actuator apparatus having a preloaded and prebiased force limit apparatus formed as an integrated assembly and providing rapid response to a force slightly less than a preselected damaging or jamming back force or load on the actuator apparatus, and particularly providing rapid response to movement of the positioned device such as a valve or damper in HVAC systems to either end limit position or in response to any other obstruction effectively creating a damaging loading in the drive system of a corresponding nature and level. The invention is more particularly directed to an actuator apparatus having an integrated spring-loaded force/torque limit apparatus which is adapted to an electric motor driven power source, and particularly adapted for open loop or closed loop control. The force/torque limit apparatss in one aspect of the present invention is fabricated as a self-contained assembly which is readily incorporated into and coupled to the various types of actuators including various linear valve and damper actuators, rotary actuators and the like, and in one preferrred cnnstruction is coupled through a pivotal lever unit.

Generally in accordance with the present invention, a prime mover such as the electric motor is coupled through a mechanical force amplification mechanism to a positioning lever which is coupled to positively position a device such as a valve, damper or the like. The lever is also interconnected to a special force/torque limit apparatus for generating a limit indicating signal in response to an abnormal force level within the system. The limit indicating signal is generally and preferably coupled to terminate energization and operation of the motor to avoid further increases in loading of the systems and which maintains the holding forces in the system at the last position and thereby holds the actuator in the last position, until otherwise reset. The force/torque limit apparatus generally includes a preloaded and thus prebiased spring holding a switch operator coupled to a switch unit for generating a limit signal which can be incorporated in suitable control such as motor shut down circuit. The operator preferably includes a linear moving rod member coupled to a single coil spring which is compressed between movable spring stops. The rod is mounted for bi-directional movement with operative engagement with the spring keepers or stops during normal positioning of the positioned device and for further movement in response to a force greater than the spring force with the positioned device locked against movement. The switch operator includes an opening for receiving a pivoted lever which is coupled to the drive system for the positioned device. Any excessive load within the drive system pivots the lever about a relatively fixed pivot point and moves the switch operator to actuate the switching units. The switch operator is therefore an essentially stationary member coupled to the pivoted lever member. The pivoting of the member however is such that there is no actual movement of the switch operator until the abnormal load condition is established at which time it moves rapidly into operative engagement with the switch unit.

The limit apparatus is in one aspect of the invention constructed as a self-contained integrated assembly with a lever coupling means which adapts the assembly to various linear and rotary actuators.

In a particularly unique linear actuator, the motor is coupled to a low efficiency lead screw positioning device. The motor is coupled directly or through a gear amplifying mechanism to the lead screw for linear motion of a positioning follower. The lead screw is mounted in parallel relation to a linearly moving valve coupler which is connected to a valve positioning shaft. The integrated limit apparatus assembly is mounted to support the switch operator for movement parallel to the valve shaft and the lead screw. A lever is pivotally coupled to the follower, to the valve stem coupler and to the switch operator. The movement of the follower causes the lever to pivot about the coupling at the switch operator with a corresponding movement of the valve stem and coupler for positioning of the valve or other positioned devices. At the end of the stroke of the valve stem unit, the coupling of the lever to the valve coupler is in essence fixed and consequently the lever now moves or pivots about that point in response to the further drive movement established by the motor in the same direction. This results in an essentially instantaneous change and pivoting of the lever with the end portion coupled to the switch operator moving with a linear motion as well as a pivoted motion. The switch units are located in substantial engagement with the switch operator and may provide rapid switch operation with a preselected small input movement of the lever. The result is a rapid generation of an appropriate signal which can be used to terminate the motor operation and generate an alarm signal, an end-of-stroke signal to a controller which can be computer based or the like.

The actuator of the invention is readily used in the various control systems with the end limit signals connected to the controller for proper and effective energizing of the actuator or actuators of the control system. Thus, the force limit signals may provide motor energizing control to prevent damage to the actuator motor and other parts of the system, a fail safe setting of the environmental control device, setting of the reference range in the control systems and the like. A potentiometer or other proportional signal device may be added to the actuator to produce a signal proportional to the position of the control device and the control device continuously positioned to match the demand signal.

The motor is selected or designed to provide an output torque or force sufficient to overcome the load created by the motor, the coupling mechanism and the positioned device including the static pressure normally placed on the positioned device such as the valve and-/or damper, its operation and the closing pressure at the ends of the positioning strokes. As the force must be sufficient to overcome these various loads, under the limit positions and conditions, the force generally would constitute a damaging force to the mechanism and/or the motor structure as such by overheating of the motor and the like. Therefore it is important to terminate the energization of the prime mover under such limit conditions and the signal would normally be used therefore.

In a preferred construction, the single compression spring, which is prebiased, can be constructed with a low rate spring characteristic such that a slight change in the force results in the significant change in the movement. The closing force can therefore be quite large. The increment of force necessary to actuate the switch however is small. This provides the desired very rapid response with essentially minimal overloading of the mechanism and/or prime mover. Further, limit signals and actuation of the switch is not only rapid but at a well defined point in the travel of the drive system and positioning mechanism.

The low spring rate characteristic also permits the use of a relatively low cost switch unit, which can require relatively significant travel for operation. The response characteristic also further permits the necessary limit functioning with relatively large manufacturing tolerances in the drive mechanism. The force limit assembly is essentially a totally stationary mechanism in that the spring, switch and switch rod are totally stationary except at the time of actuation of the switch units. This permits the mounting of the assembly with the switch contacts in close spacement to the switch operator, and permits in-house calibration of the switches assembly at the point of manufacture and eliminates the necessity for field changes and calibration. Further, because the device is completely force responsive, it operates directly in response to the loading and thus is not effective by changes in the valve mechanism as such. For example, the length of the valve stem or the stroke, can be varied and coupled to the coupler as required without effect of the switch operation. Similarly, the tolerances of the parts as well as dimensional changes of the parts with use will not change the switch operation.

The switch units as such can be any suitable type, such as mechanical microswitches, snap action switches or the like. Other forms of switches such as field sensitive switches including a Hall cell switch, a piezoelectric switch or the like can also be used. Mechanical switches generally provide a built-in memory such that once actuated they will maintain its state until reset. The field sensitive switches may require special constructions or control circuits to provide a memory interlock.

The paralleled arrangement of the adjustor, the valve stem and coupler and the integrated spring structure is particularly desirable in providing of a relatively flat compact assembly which can then be formed of a height and width as required and with a depth closely related to planar alignment with the piping. This is desirable because reasonable space is generally available in the plane of the pipe. In contrast, the space in a plane perpendicular to the piping is usually quite restricted. Similarly, damper units are more conveniently provided with an actuator assembly constructed to fit within the plane perpendicular to the damper rather than in a plane lying in the plane of the damper unit as such.

In a rotary system, for a damper or other device, an output sector gear is often provided for moving the positioned damper. The present invention may mount the limit apparatus or unit to the sector gear. A lever is secured to the output shaft of the gear train which is coupled to the switch operator of the limit device. The lever moves with the integrated limit unit and the sector gear to position the damper. When a limit position or condition is reached, the shaft is held against movement. The continued movement of the sector gear will move the switch operator against the lever and actuate the appropriate switch for control of the motor energization.

In a particularly practical and unique construction of the limit apparatus, a single elongated coil spring is preloaded within a tubular housing having outwardly projecting mounting plates for receiving a pair of switch units. A switch operator is journaled in the housing within the coil spring, with the opposite ends of the operator engaging coil guides abutting the opposite ends of the spring. The operator projects outwardly toward the switch units and includes a lever coupler and a pair of switch actuating arms projecting laterally from the lever coupler. The lever coupler in a preferred construction includes an opening within which a pair of spaced knife-egged members are spaced to receive a flat lever end to establish a low friction pivotally lever engagement. The switch arms are in operative engagement, or in close spacement, with the switch actuating element of the respective switches. The tubular housing may be provided with mounting flanges for securing the integrated device to a suitable support such as a drive housing or the like.

Although other devices have broadly suggested use of an open loop control system, the present limit control unit of this invention uniquely and particularly adapts the actuator to an open loop control. The limit unit of this invention provides precise identification of the valve and actuator movement between the fully opened and closed position and alternatively also provides an accurate identification of the time required for similar movements with a constant movement of the valve. With the time base known and monitored, the system can directly incorporate an A.C. synchronous drive motor which produces a constant rate of movement in the positioning of the valve into an open loop control. With the distance monitored, the limit unit is uniquely adapted to incorporation of a stepper motor in an open loop control for positioning of the valve based on the total number of steps known to transverse between the two limits. In either instance, the valve unit is driven between a fully opened and a fully closed position and the appropriate factor monitored by an appropriate logic unit such as a microprocessor. Each time the valve is to be initially used or at periodic intervals, the control system is initialized by the driving of the valve to a reference position and resetting the valve from that reference position as required. In summary, the accurate identification of the limit positions by system operation permits use of the appropriate open loop control with a resulting simplification in the control system. An open loop system with a microprocessor particularly permits a highly reliable electronic control with a cost effective construction.

The present invention with the factory assembled and pre-set limit unit also provides a particularly simple structural arrangement which can be assembled at time of actuator manufacture and then installed in the field without the necessity for field adjustment, other than such as may be necessary to match the initial coupling of the valve and positioning coupler depending upon the particular size and length of the valve rod of the valve itself. The factory adjustment is built directly into the fabrication procedure with the necessary accurate location and connection of the components establishing a high degree of accuracy and repeatability. This is of practical significance with respect to the acceptability of the device for installation in institutional, commercial and like environmental control systems. This invention produces a positioning system which has a high degree of economy in manufacture and maintenance as well as producing reliable and repeatable operation.

BRIEF DESCRIPTION OF DRAWINGS

The drawings furnished herewith illustrate preferred constructions of the present invention in which the above advantages and features are clearly disclosed as well as others which will be readily understood by the following description.

In the drawings:

FIG. 1 is an elevational view of a valved flow line in a heating, ventilating and air conditioning system;

FIG. 2 is an enlarged view, partially in section, of the actuator shown in FIG. 1;

FIG. 11 is an enlarged fragmentary plan view illustrating the drive coupling of the damper unit shown in FIG. 10 and clearly illustrating an alternate embodiment of the present invention;

DESCRIPTION OF THE ILLUSTRATED EMBODIMENTS

Figure 3:
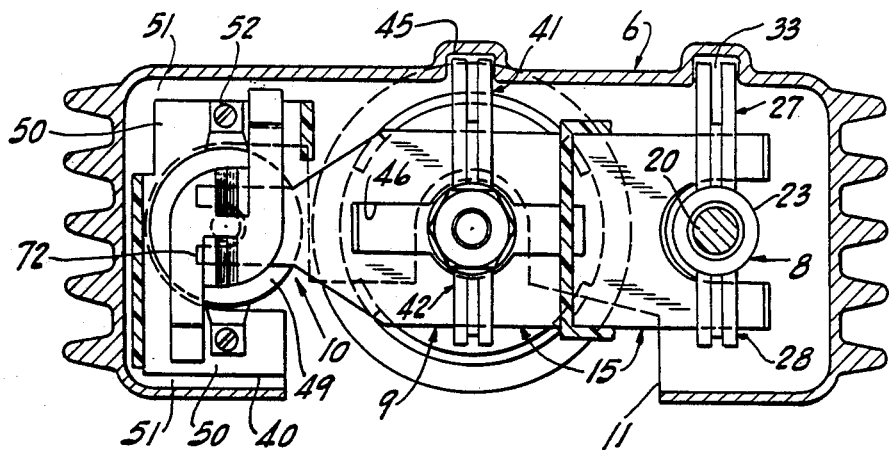
FIG. 3 is a horizontal section taken generally on line 3—3 of FIG. 2.

Referring to the drawings and particularly to FIG. 1, the illustrated embodiment of the invention includes a flow valve 1 connected in a flow line 2 from a water heating or cooling unit 3 to a heat exchanger 4 for heating or cooling of the environment at the exchanger. A valve actuator 5 constructed in accordance with this invention and illustrating the embodiment is mounted to the valve 1 and operates to position the valve.

Referring to FIG. 2, the valve actuator 5 includes a support housing 6 having a drive motor 7 mounted to the upper wall and coupled to drive a positioning mechanism within the housing 6. The position mechanism includes a lead screw unit 8 coupled to motor 7, a valve coupler unit 9 coupled to the valve 1 and a force/torque limit unit 10 formed as an integrated assembly.

As shown in FIGS. 1-3, the housing 6 is generally a rectangular shaped housing having a depth on the order of the depth of the valve 1 and piping 2, and having a width and height necessary to accomodate the several drive units 8-10. The width or principal elongated dimension of the rectangular housing can be aligned with the valve 1 and pipe connections 2 and projects outwardly thereof. One face of the housing 6 includes a central opening 11 to permit access to the several units during installation and maintenance, and an upper U-shaped extension side wall 11a is shown for housing of the motor 7 and the electronic drive 11b for the motor 7. A cover 12 is provided to essentially close the sidewall 11a and the opening 11a to housing 6. A small slot or opening 13 is shown between one edge of cover 12 and the front wall 11 opening which permits visual viewing of the valve position as shown by a lever component as presently described.

The lead screw unit 8 and the force/torque limit unit 10 are secured to the opposite ends of the housing 6 with the valve coupler unit 9 located centrally thereof. A force transmitting lever 15 spans the housing 6 and is coupled to each of the three units 8, 9 and 10 within the housing to transmit the motor drive to position the valve 1 under normal operation and to actuate limit unit 10 and particularly a different one of a pair of switches 14 at each limit position of the valve 1, or under a limit condition at any position of lever 15.

The support housing 6 has a bottom wall 16 with slot 16a which slips over an upstanding threaded hub 17 of the valve 1. A nut 18 on the hub 17 clamps the housing to the hub and thus releasably mounts the drive assembly to the valve 1. A valve stem rod 19 projects upwardly into the valve coupler unit 9 for connection to the lever 15 and corresponding positioning of the valve 1.

The valve 1 may be any suitable positioned device responsive to a linear motion in the illustrated embodiment and no further description thereof is given other than as necessary to fully describe the illustrated embodiment of the invention, which is particularly directed to the actuator apparatus.

Figure 4:
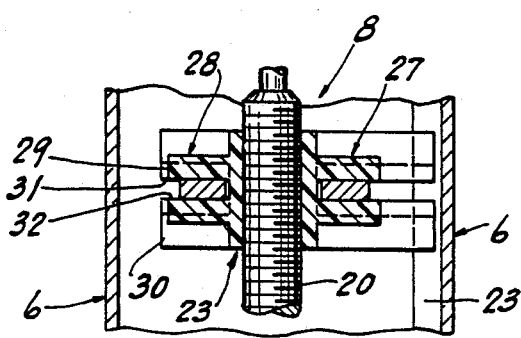
FIG. 4 is a vertical section taken generally on line 4—4 of FIG. 2.

The illustrated motor-driven lead screw unit 8 is located within a pocket formed to the one side of housing 6 by the partial front wall as shown in FIGS. 3 and 4, and consists of a lead screw 20 rotatably journaled in the bottom wall of the housing 6 by a suitable bearing unit 21 at the lower end and a motor coupling at the upper end. The lead screw 20 projects upwardly through the top wall and is coupled to the gear reduction element 22 of the A.C. motor 7 which is secured to the top wall of the housing 6. The upper end of the drive shaft is shown projecting upwardly of the motor and is provided with a knurled knob 22a to permit manual rotation of the lead screw 20. A tubular follower 23 is threaded onto the lead screw 20, as shown in FIGS. 2 and 4, and is vertically positioned in accordance with the rotation of the lead screw 20 btween the opposite ends thereof. The lead screw converts the motor torque to a linear force with amplification.

The lever 15 is bifurcated to project about the follower 23, as shown in FIG. 3, and is coupled thereto as follows. Oppositely projecting wing members or arms 27 and 28 are integrally formed on diametrically opposite sides of the follower. Each wing member 27-28 is similarly constructed to receive the corresponding adjacent bifurcated end of the lever 15.

Referring particularly to FIGS. 2 and 4, the wing member 28 includes similar lever support and pivot walls 29 and 30 which are vertically spaced, as viewed in FIGS. 2 and 4, by a distance slightly greater than the thickness of the lever 15. The vertically spaced pivot walls are formed with opposing knife edges 31 and 32 for supporting of the lever 15 projecting therebetween. The spacing is preferably slightly greater than the lever thickness to accommodate the pivoting of the lever and the increase in the apparent thickness of the lever which arises upon relative pivoting movement of the lever within the pivot members. The knife edges 31 and 32 define a low friction engagement with the lever 15 while establishing and maintaining accurate positioning and alignment of the lever 15. The walls 29 and 30 project outwardly from the tubular body follower 23 to about the width of the housing 6 to provide a significant interengagement and reliable support of the lever 15. The one pivot wall 27 projects laterally into a vertical guide slot 33 in the back wall of the housing. The interengagement serves to prevent the rotation of the follower 23 and thereby establishes the axial movement of the follower in response to the rotation of the screw 20.

In a fail-in-position unit, as shown in FIGS. 1-9, the screw member 20 is specially selected with an acme screw thread and with a substantial number of threads per inch such as 12 to establish a relatively inefficient screw follower mechanism. This is desirable in contributing to a holding force on the valve in the event of a drive failure. Thus, if the motor energization is terminated because of the valve 1 moving to a limit position or should terminate for any other reason, the mechanical forces in the connection between the motor 7 and the valve 1 are designed to create a sufficient mechanical load on the valve 1 to prevent movement of the valve under the static and dynamic pressures created within the valve by the moving liquid. However, the same acme threaded screw unit can also be used in a reset actuator, as hereinafter described.

The screw unit 8 thus accurately positions the one end of the lever 15 and through the coupling to units 9 and 10 positions the valve 1.

The lever 15 is a plate-like member having a width slightly less than the depth of the housing, and projects laterally from the screw unit 8 about the valve coupling unit 9, as shown in FIG. 3.

Figure 5:
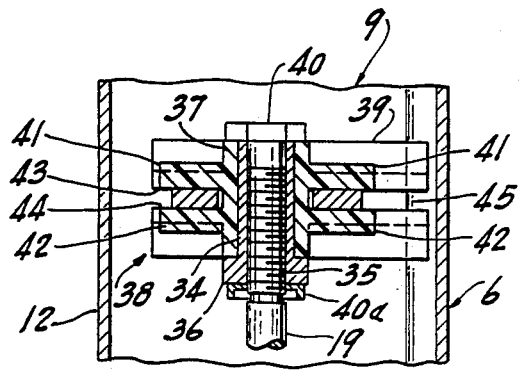
FIG. 5 is a vertical section taken generally on line 5—5 of FIG. 2.
Figure 7:
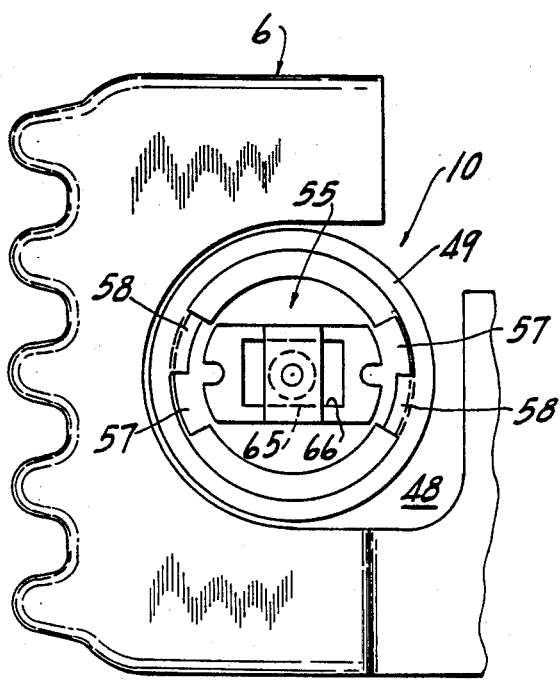
FIG. 7 is a view taken generally on line 7—7 of FIG. 2.

Referring to FIGS. 2, 3 and 5, the valve lever coupling unit 9 includes a tubular coupler 34. Coupling shaft 19 projects upwardly from the valve 1 with a threaded upper end 35. Shaft 19 may vary in length because of manufacturing tolerance or the like and the coupler has a sufficient threaded length to accommodate such variation while maintaining a sufficient length of threaded engagement for the forces encountered in the system. The inner end of the coupler 34 includes a knurled surface member 36 below a coupling member 37 for manual adjusting the position of the coupler 34 and thereby coupling unit 9 on shaft 19 for proper valve movement with unit 8 and lever 15. Coupling unit 9 includes tubular lever coupling member 37 with oppositely projecting wing members or arms 38 and 39. The member 37 is held about the threaded coupler 34 by an upper end nut 40, which is press fitted or otherwise secured to the outer end of coupler 34 with the coupler 34 free to rotate within member 37. A lock nut 40a, such as a simple Pal nut, is provided for locking engagement with the member 36 to prevent relative movement of coupling unit 9 relative to shaft 19 during valve movement. The lever coupling wings or arms 38 and 39 include vertically spaced walls 41 and 42 having knife edges 43 and 44 and forming an essential duplicate of the follower 23 of the lead screw unit 8. The one wall 41 of the one arm 38 extends laterally into an offset groove or recess 45 in the back wall of the housing 6 to again prevent rotation of the coupler.

The illustrated coupling unit 9 with the end nut members is located for maximum access and ease of assembly. The shaft 19 is generally formed with a finished sealing surface. Convenient assembly is important so that the assembler will not place a tool on the shaft as such in coupling shaft 19 to coupling unit 9.

The lever 15 includes a longitudinal slot 46 with a central opening of the diameter of coupler 34 and with a slot width corresponding to the depth of the pivot coupler arms 38-39 and of a length corresponding to the uppermost pivot wall 41. For assembly, the coupler unit 9 is located with wall 41 and the slot 46 aligned, the lever 15 is moved over and into alignment with the knife edges and then rotated to couple the lever 15 to the coupler unit 9 with the opposite sides of the lever 15 located respectively between the knife edge walls 43 and 44, as shown in FIGS. 3 and 5. The knife edge structures again provides low friction engagement with the opposite sides of the lever to define a firm and reliable coupling to the valve without loss of response. The internal threaded coupler 34 is threaded onto the coupling shaft 19 to properly locate the lever 15 for corresponding and proper movement of the valve with the movement of the coupling member 37 and follower 23. The valve 1 is then readily positioned between the limit positions of the valve.

The outer end of the lever 15 is coupled to the limit unit 10 which functions as a fixed pivot location for the lever under normal valve positioning between the limits. Thus, as follower 23 moves on screw 20, lever 15 pivots about unit 10 and moves the valve coupling unit 8 vertically and thereby repositions the valve 1.

Figure 6:
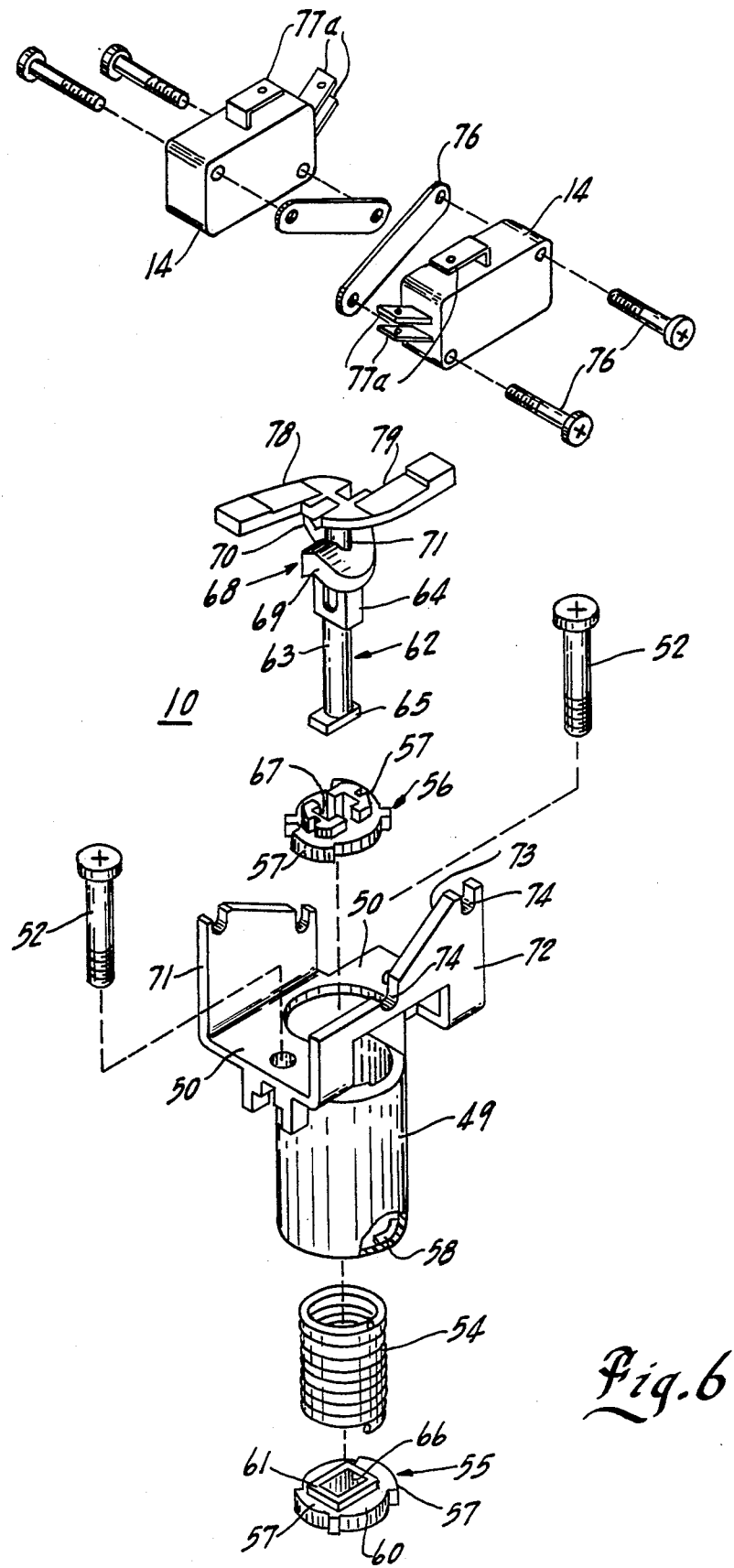
FIG. 6 is an enlarged exploded pictorial view of a pre-loaded bias spring limit unit shown in FIG. 2.

The special force/torque limit unit 10 is secured within a pocket 48 shown to the left side of the housing 6 in FIGS. 2, 3 and 6. The unit 10 is fabricated as an integrated subassembly which is releasably secured as a subassembly within the housing 6 during fabrication of the actuator. Generally, the limit unit 10 includes a spring housing 49 of a diameter slightly less than the depth of the housing 6 and having laterally mounting flanges 50 extending laterally from the upper end thereof. The valve housing 6 is provided with internal ledges 51 to which the flanges 50 are secured by appropriate attachment screws 52 passing through the flanges and threaded into the ledges to firmly but releasably attach the unit 10 in position.

A coil spring 54 is located within the housing 49 with a diameter slightly less than the inner diameter of the housing. The spring 54 is compressed within the housing 49 between a bottom keeper 55 and a top keeper 56. The keepers 55 and 56 are releasably secured within the housing, and are similarly formed. As most clearly shown in FIGS. 2, 6 and 7, the keepers 55 and 56 include similar locking tabs 57 defining a diameter corresponding to the diameter of the housing 49 and movable into locking relationship with locking tabs 58 on the housing to hold the keepers in place under the force of compressed spring 54.

Referring to the bottom keeper 55, the keeper includes a bottom disk portion 60 somewhat smaller than the opening defined by the inwardly projecting tabs 58. The disk portion includes the pair of oppositely located outward locking ears or tabs 57 with a diameter approaching that of the internal diameter of the housing. Thus by aligning the ears with the open portion of the bottom wall, the keeper 55 is moved into the housing beyond the housing tabs 58. The keeper 55 is then rotated to place the tabs over the housing tabs. The spring compressed between the keepers forces the tabs into firm clamping and supportive engagement to lock the keepers in location and hold the spring compressed. The bottom wall of the disk member is preferably provided with a pair of spaced apertures for accepting of a turning tool which can be inserted to compress the spring unit and release the tab pressure, thereby permitting rotation of the keeper to a release position. The inner surface of the keepers include a central projecting hub 61 acting as a spring guide.

The upper keeper 56 is similarly formed with a locking tab mechanism for releasable location within the upper end of the housing 49 for compression of the sping 54 therein.

A switch operator 62 includes a shaft or rod 63 with guide member 64 slidably journaled in the upper keeper 56 and extending downwardly through the spring 54 and the bottom keeper. The outer end of rod 63 includes an integral locking member 65, shown as a rectangular member of a width equal to the rod, to define outwardly projecting walls. The locking member 65 is adapted to slide through a corresponding formed slot 66 in the bottom keeper 55. During assembly, the operator rod is passed through the spring assembly and rotated to effect a lock position. The rod and switch operator is free to move downwardly of the keeper 55 with member 65 moving from the keeper. During upward movement, the member 65 engages the keeper 55 and moves upwardly to further compress the spring. The upper end is guided within the upper keeper 56 by the guide member 64 which has a rectangular shape corresponding to a rectangular opening 67 in the keeper 56.

The upper end of the switch operator rod and particularly guide member 64 is formed with an enlarged knife edge pivot portion or head 68, the underside of which rests on the upper end of the top keeper 56. Downward movement of the operator 62 in FIG. 2 results in a corresponding movement of the keeper 56 to compress the spring 54. The knife edge pivot head 68 includes a pair of spaced knife edge members 69 and 70 joined by a rod member 71 and integrally formed as a single element with the operator. The knife edge members 69 and 70 are spaced from each other to define an opening for receiving the end of the lever 15. The knife edge members are also spaced from each other by a distance somewhat greater than the thickness of the lever.

Figure 8:
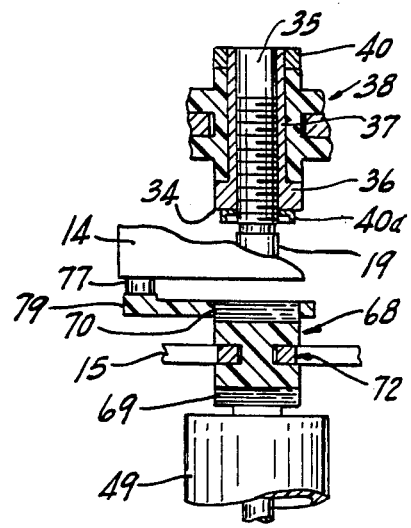
FIG. 8 is a view taken generally on line 8—8 of FIG. 2.

The end 72 of the lever is bifurcated and projects between the knife edge members about the connection rod 71 as most clearly shown in FIGS. 3 and 8. The lever 15 is thus pivotally mounted between the opposed knife edge mmmbers 69 and 70.

Under normal load conditions as heretofore discussed, the preloading of the spring 54 establishes the opposed pivot knife edge portion 68 as a fixed pivot support for the lever 15. Thus, the force of the spring is greater than any normal force or load encountered during the vertical movement of the valve coupler unit 8 and valve 1 between the closed and open position. However, if the valve coupler unit 8 is locked in position as by reaching an end limit, it now defines a fixed pivot point.

The movement of the follower 23 pivots lever 15 about unit 8 and increases the pressure at the outer bifurcated end 72 of the lever 15. Pivoting the lever 15 about the valve coupler unit 9 now results in vertical movement of the end 72 of the lever 15 within the force/torque spring unit 10, assuming the coupler unit 9 is at an upper limit position and the follower 23 continues to move upwardly. With the valve coupler unit 9 fixed, this would result in a downwardly pivoting of the end 72 of lever 15 with a compression of the spring 54, and carrying switch arms downwardly. Similarly, with coupler unit 9 at an opposite lower limit position, the lever 15 would pivot in the opposite direction to move the switch arms in the opposite direction.

Reverse movement at an opposite end of the valve 1 would provide a correspondingly reverse action on the knife edge portion 68, with the switch operator moving upwardly, compressing spring 44 and actuating one of the switch units 14.

The switch units 14 are secured to the spring housing as follows. Vertically upstanding side walls 73 are itegrally formed on the side edges of the mounting flanges 50. The walls have oppositely inclined edges 73 which extend from the end of the flange inwardly to the center of the housing 49. Mounting recesses or notches 74 are formed in the top edges in accordance with the spacing of corner openings 25 in the switches 14. The switch units 14 are respectively mounted to the side walls by straps and by appropriate clamping bolts 76 which pass through openings in the switch unit and thread into the straps.

The switch units 14 are shown as conventional enclosed snap action switch or microswitch devices having an outer enclosure and a operating pin 77 on the one side wall thereof. Three lead or terminal connectors 77a are provided in the one end wall and the opposite side wall from pin 77 to provide for three wire circuit connection in accordance with known signal pole, double throw switches. The switch units 14 are located in reverse orientation whereby the switch pins 77 are located within the opposite sides of the housing 6.

The uppermost end of the switch operator 62 is provided with oppositely extending switch arms 78 and 79 extending from the top knife edge head 68. The outer ends of the arms 78 and 79 having slightly raised pads which project upwardly into operative engagement with the depending wwitch pins 77. With the pivot head 68 held in the relatively fixed location, the switch units 14 are located with respect to the arms 78 and 79 such that the one switch is operated by arm 78 and the other pin 77 is spaced slightly from its arm 79. The dropping of the operator 62 results in release and actuation of the first switch. The raising of the switch operator 62 results in the activation of the alternate switch 14. Each switch 14 may be a single or multiple contact unit of any suitable construction depending on the motor control circuit and may be a simple single-pole, single-throw switch with the contacts selectively connected to effect an open and closed circuit supply to the actuator motor 7. A signal pole, double throw switch unit as shown may be used to provide a first contact connected to energize the motor for proper directional movement and a second contact to produce a separate signal to the controller that the particular limit has been reached.

The illustrated knife edge couplings of the lever 15 to the various actuating and actuator devices is of significance in producing minimal friction loading on the pivoting lever and the interconnected mechanimms. The knife edge pivot members of the several units including the switch unit, as previously discussed, are preferably spaced slightly in excess of the thickness of lever 15. The spacing will establish and maintain a minimal space between the nonengaged knife edge member 69-70 and the lever 15 in the midrange position of the lever 15. In the maximum positions, the lever preferably touches both edge depending on acceptable tolerances. Spacing of the pivot knife edges for a distance somewhat greater than the thickness of the lever 15 is desired to accommodate the varying angled orientation of the lever with the unit without unduly stressing the structure of unit 8 or loading of lever 15. At the mid-range, the lever 15 then pivots on a single knife edge member during the desired valve positioning. The reversing of the valve positioning is accomplished by a reversal in the movement of the lever 15 from the one knife edge member 69 to the other 70. This spacing introduces a very slight lost motion into the mechanism at the middle range of the travel. The system avoids responses however to a transient type of a condition and does not significantly adversely affect the response characteristic in response to the overload condition.

As the limit is reached, any slight overloading of the unit results in an essentially instantaneous transfer of the pivot from the force/torque unit to the valve coupler with a rapid amplified pivoting of the outer end of the lever and movement of the switch operator to actuate the switches. The switch operator is preferably located in essential engagement with the one switch unit and close spaced to the other.

In the normal valve movement, the prebiased spring rigidly holds the operator within the housing. There is no relative movement tending to actuate the switch units even in commercial environments. Consequently, the switch units 14 themselves can be made sensitive to relatively small movement of the lever and the switch operator.

Figure 8A:
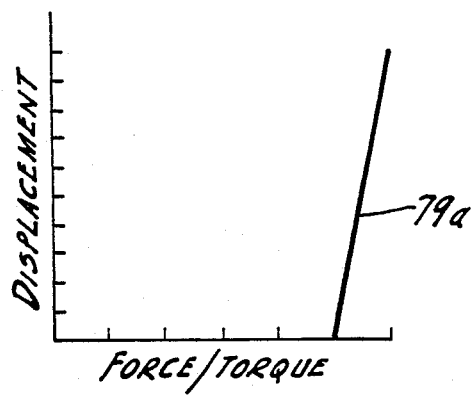
FIG. 8a is a graphical illustration of force versus deflection of the limit unit.

The advantageous force versus deflection characteristic of the limit assembly with the prebiased spring having a low spring rate is illustrated in FIG. 8a. The force applied at the operator is shown on the X-axis while the deflection of the operator is shown on the Y-axis. The force limit is arbitrarily shown at a point on the X-axis corresponding to the desired force limit. The spring characteristic is shown by the steep inclined vertical line 79a extending upwardly and to the right in FIG. 8a. Thus, until the force reaches the limit force, there is 0 deflection. A force slightly greater than the limit force results in deflection of the spring, and a corresponding movement of the switch operator, with a slight increase in the force resulting in a significant deflection of the spring and movement of the associated switch operator. Generally, the spring rate usable with the present invention includes about the range of 20 to 75 pounds per inch. In an actual commercial construction for operating of water valves in a heating, ventilating and air conditioning system, a spring rate of 35 pounds per inch is used satisfactorily. With the steep characteristic resulting from the low spring rate, once the force limit is reached, significant deflection results for slight increase in force. For example, if a distance of one hundredths of an inch is desired to actuate the switch, and with a spring having a spring rate of 35 pounds per inch, the force need only change by 0.35 pounds. The present invention thus provides the prebiased spring to hold the force limit unit effectively inoperative until the force limit is reached, at which time it the force limit unit rapidly responds to any further increase in force. The limit unit thus provides a device defining a sharp changeover position in combination with significant movement for reliable switch operation without the necessity of close calibration of the switch position and the like.

In the preferred construction, the limit unit is formed with a fixed geometry in which the spring is preset in a fixed assembly at the factory. This completely eliminates field calibration and establishes very effective and reliable system operation.

The separate assembly unit which is separately coupled to a drive mechanism adapts the limit unit for application in various types of actuators. Further, the separate integrated assembly avoids the necessity of incorporation or direct integration into the other components of the actuator, such as the valve coupler or the lead screw unit. The spring selection is not therefore restricted by the space otherwise available within the other components of the actuator such as if the spring were incorporated as an integrated part of the coupler and/or lead screw unit. This permits selection of the spring of a necessary size to provide the desired spring rate.

The system thereby provides accurate and rapid response in the setting of the valve structure and in the actuation of the disconnect switch or the stop switches.

The pivot coupling members for the lead screw follower 23, the valve coupler 37 and the force/torque spring coupler head 68 may be formed of a suitable high strength, low friction plastic such as a carbon and Teflon plastic filled Nylon plastic. The housing may be formed of a suitable plastic, such as glass filled Noryl plastic. This permits convenient commercial mass production of the components.

The illustrated embodiment of FIGS. 1-8 discloses a valve actuator with a fail-in-position construction. Thus, if for any reason the control should malfunction to stop the motor operation or the motor should fail, the valve remains in the last set position. Although the static pressures within the valve may tend to drive the valve from the set position, the mechanical loading within the mechanism of the lever structure promotes the holding of the valve in the failed position. Further, to promote this type of construction, the lead screw is specially selected to introduce significant frictional and mechanical losses. For example, the described use of an acme thread screw significantly reduces the mechanical efficiency of the system. In a typical application, the system may be selected to introduce frictional and mechanical losses whereby only approximately one-third of the total output power of the motor is delivered directly to the valve closure. Upon failure, this one third power force then appears as a reset force at the input of the unit 8. The same losses will be created in the return path, resulting in effectively approximately one ninth of the motor force appearing at screw member and the motor shaft. For all practical purposes, this will insure holding of the valve in the failed condition. The valve may of course be designed with a fail safe reset operation by use of the limit signal to move the valve to the fail safe position. The limit switch unit may produce a signal to a controller to establish the fail safe position.

The actuator can be readily converted to a mechanically reset positioning device by adding of a return spring unit or the like to drive the positioning actuator and therefore the valve to either limit position upon failure of the motor. A modification of the embodiment of FIGS. 1-8 is shown in FIG. 9.

Figure 9:
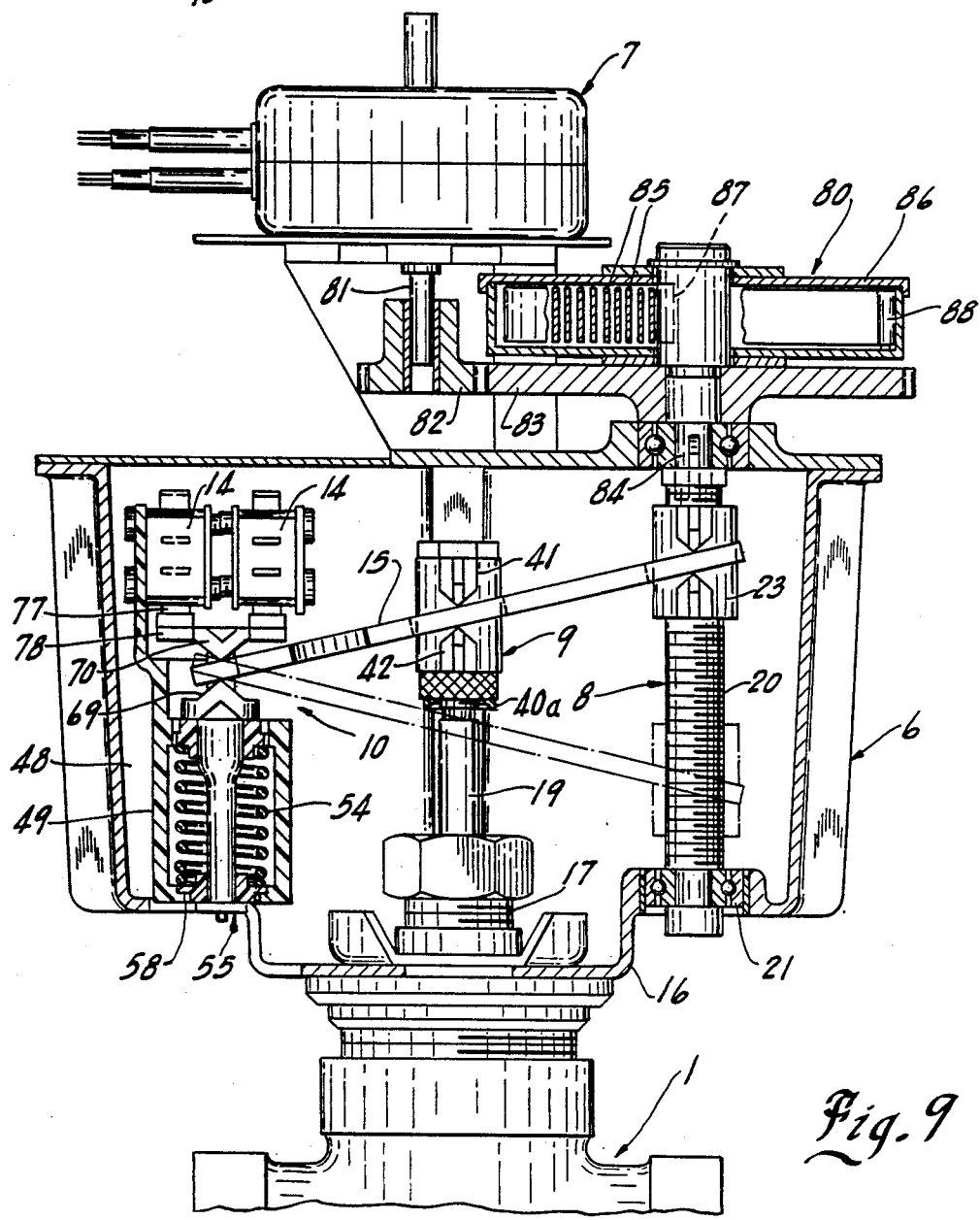
FIG. 9 is a side elevational view similar to FIG. 2 illustrating an alternate construction with a reset spring structure added to the embodiment shown in FIG. 2.

The embodiment of the invention shown in FIG. 9 includes a valve 1 and actuator 5 essentially corresponding to that shown in the first embodiment. In the embodiment of FIG. 9 however, a reset spring unit 80 is interposed between the motor 7 and the lead screw unit 8. Generally, except for the interposition of the spring unit 80, the other components may be constructed as shown in FIGS. 1-8 and for purposes of simplicity and clarity of explanation, corresponding numbers are applied to the two embodiments. Only the revisons appearing in FIG. 9 are presently described, with reference to the other components as necessary to fully set forth the modification and its function to the strutture.

Referring particularly to FIG. 9, the reset spring unit 80 is located to the top wall of housing 6 and is interposed between the motor 7 and the lead screw unit 8. The motor 7 is offset from axial alignment with the lead screw unit 8 and the output shaft 81 is coupled to the lead screw unit 8 through a small gear 82 on the shaft 81 and a large gear 83 to increase the input torque to the lead screw unit 8. The screw shaft 84 of unit 8 projects through spring unit 80 and is coupled thereto.

The reset spring unit 80 as illustrated is of a well known spiral spring construction. A flat spiral spring 85 is housed with a suitable mounting enclosure or housing 86 located above the gear 83. The inner end of the coil 85 is aligned with and coupled to shaft 84 as at 87. The outer end of the coil spring 85 is secured to a pin 88 on the housing 86. Rotation of the shaft 84 in the direction to move the valve from a reference position winds the spring 85 about the shaft 84 increasing the tension force in the spring. When the motor 7 is de-energized, the spring force is sufficient to reverse the rotation of the lead screw unit 8 as the spring unwinds and returns the valve 1 to the initial reference position. The frictional forces in the drive mechanism serve to load the spring and provide a smooth and gradual return and reset of the valve or other load environmental control to its position without damage to the positioning device. With the present actuator having the inefficient lead screw unit 8, it is important that the return spring be introduced between the motor and the lead screw unit to provide a most effective reset of the valve as well as providing a most convenient assembly and maintenance of the drive.

The spring return, for example, could be placed around the valve stem, as presently used in pneumatic valves. The spring however would have to push axially and upwardly on the valve coupler, and as a result of the lever coupling, drive the associated elements of the lead screw unit 8 and motor 7. The spring return would therefore be working through the inefficient adjuster and lead screw unit. The spring unit would have to be stressed such that the force of the spring was sufficient to drive the total load during reset. The spring unit is also a further load on the motor. The motor torque required to compress the spring to the reset level would be increased above the actual force created within the spring because of the losses in the inefficient transfer of the force to the spring unit through the inefficient lead screw coupling during the stressing of the spring unit. This would increase the size of the motor. If an efficient lead screw unit such as a conventional ball screw type were used, the spring unit could be placed on the lower end of the lead screw. Such a system would be particularly difficult with the preferred construction of an actuator with this invention because of the high mechanical amplification at the inefficient lead screw and its large number threads/inch, and particularly with stepper motors which may have 10-15% residual (detent) torque. A spring located on the valve stem may not return the actuator and valve to the normal reference position.

The return spring is therefore located between the motor and the lead screw unit. The spring unit is thereby directly driven and stressed and upon reset need only rotate the lead screw and/or motor rotor several turns. For example, a ¾" valve with a 12 pitch (threads/inch) thread would require ¾"×2 (lever ratio)×12=18 revolutions.

The same basic actuator including units 8-10 can, in this manner, be applied for a fail-in-position system, as well as for a spring return or reset unit by adding the external mounting of the motor and spring unit.

The embodiment of the invention shown in FIG. 9, otherwise operates in the same manner as the previously described embodiment with the lever action providing the appropriate positioning of the valve between its limit positions and automatic deenergization of the motor 7 at the limits or in the event of any abnormal load on the valve structure such as might cause serious damage thereto.

The invention with the integrated force/torque limit assembly is also readily applicable to a fluid flow control device having a rotating positioning input such as gear driven damper. A typical damper application is illustrated in FIGS. 10 and 11.

Figure 10:
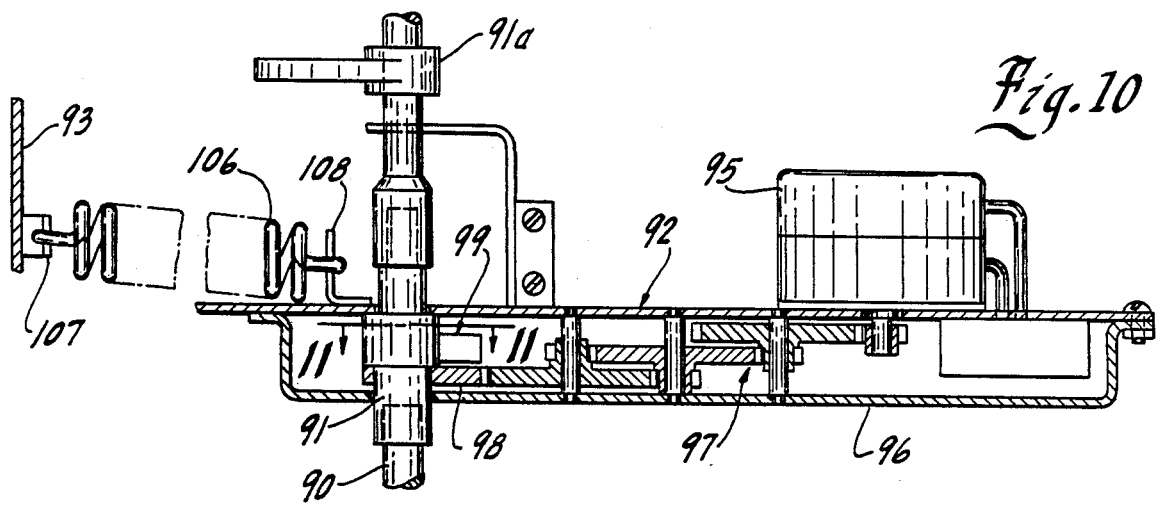
FIG. 10 is a simplified elevational view of a damper control unit incorporating a position limit apparatus constructed in accordance with the present invention.

Referring particularly to FIG. 10, a damper unit which is rotated by 90° or the like includes a shaft 90 having a square end located within a square opening in an actuator shaft 91. Alternatively, the shaft 91 may have an arm 92 which is coupled by a linkage to the damper blade. The damper is of a conventional construction having an encircling channel frame, not shown, with the blades 92 appropriately pivotally mounted and interconnected to each other and to the actuator shaft 91 by the square coupling as illustrated or the alternate linkage for simultaneously corresponding positioning of the blades.

The actuator 92 includes a basic known gear driven system including a small high speed A.C. synchronous or stepper motor 95 mounted to a suitable elongated housing 96. The motor 95 is longitudinally spaced from the rotating input member 91 and is coupled thereto by a speed reducing and torque increasing gear train 97 rotatably mounted within the housing 96. A sector gear 98 is coupled to the final drive gear of the gear train 97. The speed reduction is such that the sector gear 98 is rotated through its limits to provide the complete opening and closing of the louvers 92 and thereby providing complete desired control. The rotation of the sector gear and the damper input is limited to prevent damage to the coupling mechanism aand/or the louver structure, by the interpositioning of a spring-loaded limit unit 99 which is construced as an integrated unit corresponding to unit 10 of the previous embodiments.

The sector gear 98 is coupled to the output shaft 91 through the limit unit 99. The force/toqque unit 99, as in the previous embodiment and shown in FIG. 11, includes a prebiased limit spring assembly 101, with a switch operator 102 projecting from the spring assembly 101 into operative engagement with a pair of switches 103. A lever 104 is secured to the shaft 91 and projects laterally therefrom into a pivot lever opening in a pivot head 105 having a knife edge construction. Under normal operating conditions, the rotation of the gear train is transmitted through the sector gear 98, unit 99 and lever 104 for corresponding positioning of the damper. Under all normal load conditions, the gear 98 provides appropriate orientation and positioning of the louvers. In the event of a lockup of the shaft 100 as by a positioning of the louvers in a limit position, continued energization of the motor 95 tends to continue relative rotation between lever 104 and the sector gear 98 and limit unit 99.

The motor torque then acts on the switch operator 102 against the prebiased spring 101 to provide a corresponding and practically instantaneously repositioning of the switch operator relative to the switches 103 with an actuation of the appropriate switch.

In the illustrated embodiment of FIGS. 10 and 11, the damper actuatur 92 is shown with a reset spring 106 which is an elongated coil spring having one end connected to the frame 93 as at 107 and the opposite end connected to the rotating damper positioner as at 107a. The illustrated unit will therefore provide an automatic reset of the damper to a desired limit that is fully opened or fully closed depending upon the application requirements.

In addition to providing a limit control, the limit switch can also be incorporated into a system to provide automatic sequencing of a plurality of positioned devices such as valves, dampers or the like by providing sequential operation of the motors for the various individual actuators.

The force/torque unit is fabricated in an optimum construction as a separate subassembly for convenient mounting to or within the housing or other support. The spring force is preset at the factory and can be appropriately regulated and controlled by construction and selection of the appropriate spring unit. Adjustment could of course be built into the unit if necessary but would generally introduce not only an undesirable cost factor but would also introduce a source of possible misadjustment of the spring pressure over the life of the unit as the result of normal enviromental effects on the adjustment components.

Figure 11B:
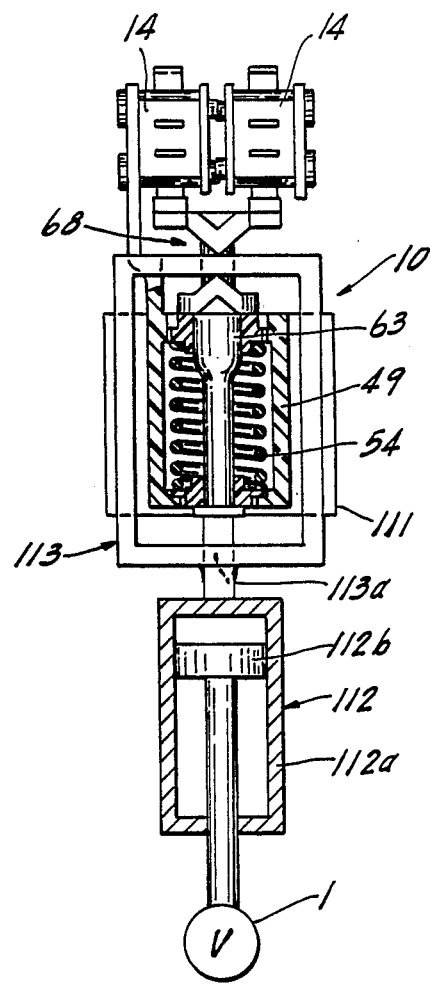
FIG. 11b is a view of the limit unit connected to a linear actuator.
Figure 11A:
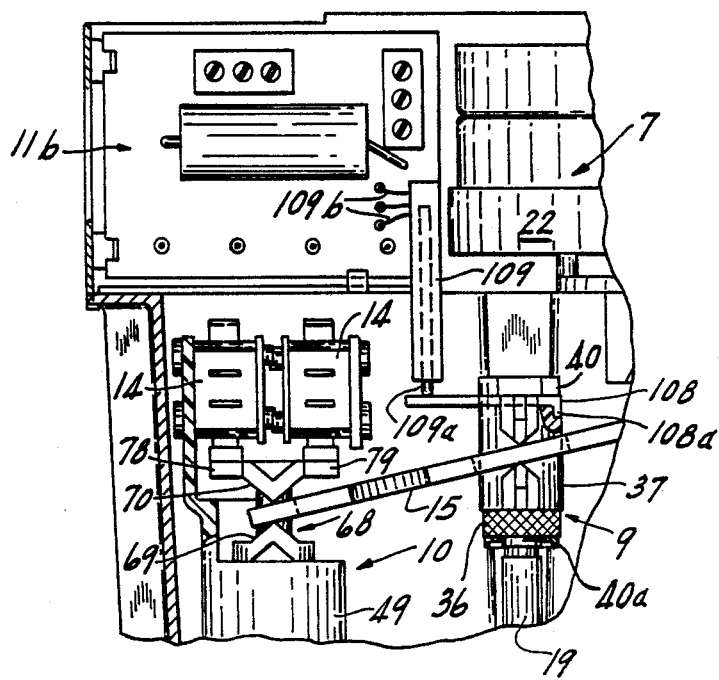
FIG. 11a is a fragamentary view of the valve coupling unit shown in FIG. 2 with a potentiometer unit for sensing the valve position.

The actuators of this invention may be incorporated into the various control systems used in environmental control systems as more fully discussed previously. In certain control systems such as a proportional controls, the position of the valve may be used to provide a proportional control. A simple sensing system may be provided by sensing the position of coupling unit 9. For example, as shown in FIG. 11a, a sensing arm 108 is secured to the coupling unit 9 and particularly to the follower 37.

The sensing arm 108 is shown as a flat member abutting the upper end of the follower 37 and having an offset end 108a mating with a recess in the follower 37. A potentiometer 109 is secured to the support housing with an output slider arm 109a located in the path of the sensing arm 108 for proportionate positioning with the movement of the coupling unit.

The potentiometer may be a simple two wire unit but is preferably a standard three wire unit having these wires 109b to provide alternate outputs. Thus, a common output wire is used with one of the other output wires, one of which provides maximum resistance in the extended position and the other of which provides a minimum resistance in the same position.

Although the embodiments with the pivoted coupling is particularly adapted to incorporation into various rotary actuators, the integrated limit unit can be adapted to other forms of actuators. For example, the force limit unit can be readily incorporated with a linear actuator having movement in line with the switch oprrator. A modification of the force limit unit is shown in FIG. 11b. The modified unit is basically structured in the same manner as that of the previous embodiments, and corresponding elements are correspondingly numbered for simplicity and clarity of explanation.

In the modified force limit unit of FIG. 11b, the housing unit 49 and associated switches 14, is mounted in a fixed support 111. A linear operator 112 is mounted to the one end of the force limit unit 10. The linear operator is shown as a simple hydraulic unit having a cylinder 112a connected to the switch operator by a rigid connecting link 113. The illustrated link is a generally rectangular member having one side connected to the cylinder 112a. The opposite sides of the link 113 extend along the opposite sides of the force limit unit 10 with the outer cross leg extended through the coupler 68 of the switch operator 63. The cylinder 112a is thus supported against axial movement by the force limit unit 10. The piston unit 112b of the operator 112 is connected to the valve or other positioned device 1. Thus under normal operation, the operator 112 is actuated to extend or withdraw the piston 112b thereby positioning of the load device. If for any reason a limit position is reached, a reaction force in excess of the spring force is created between the piston unit 112b and the cylinder 112a, creating a back force on the limit force unit 10. Any force in excess of the limit set by the fixed compression spring 54 results in the movement of the cylinder 112a and interconnected link 113, compressing the spring 54 and actuating the appropriate switch unit 14.

The limit unit 10 can otherwise of course be constructed and connected into a linear attuator or the like. For example as shown in phantom in FIG. 11b, the cylinder unit 112a could be coupled directly to the outer end of the switch operator 63 as at 113a to provide corresponding positioning of force limit unit. For such construction, the special coupling of the switch operator could of course also be eliminated and replaced with a simple rod-like extension.

Figure 12:
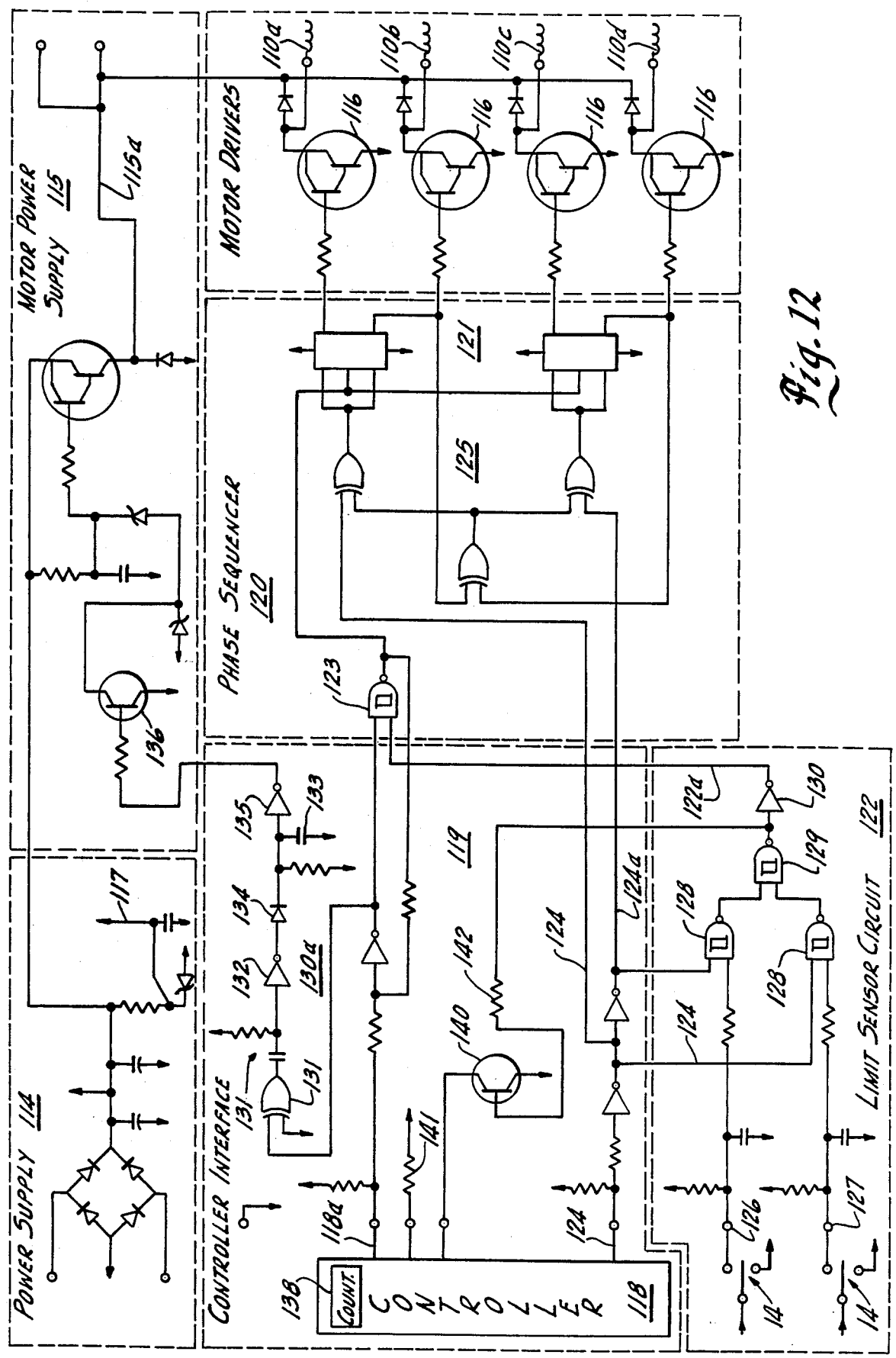
FIG. 12 is a schematic circuit of a stepper motor drive in open loop control of an actuator incorporating a limit unit in accordance with the teaching of the present invention.

The several actuators with the lever operated limit spring unit are particularly adapted to be incorporated into a loop control system and particularly in an open loop type positioning control system. A typical open loop control system using a stepper motor for a prime mover is illustrated in FIG. 12. The stepping motor 7 may be of any suitable or well known construction. The illustrated stepper motor 7 is shown as a four phase motor having four phase windings 110a through 110d. Sequential and repetitive energization of the phase windings establishes a corresponding stepped rotary motion of the motor output shaft for corresponding drive of the actuator.

The open loop control circuit includes a suitable power supply 114 for operating of the motor and the control circuitry. The motor power supply 115 is connected to supply 114 and provides a switched 24 volt D.C. supply via an output line 115a connected to energize the phase windings and thereby establish the stepping of the motor.

The sequential connection of the phase windings 110a through 110d to the power supply is controlled by individual solid state switches 116, shown as Darlington transistors, and one for each phase.

A 12 volt regulated line 117 of the power supply 114 is connected to the electronic controller which produces appropriate step signals for sequential activation of the driver switches 116. An appropriate demand signal source within a controller 118 supplies step input signals via a line 118a to a controller interface circuit 119. The interface circuit 119 couples the step signal to a phase sequencer circuit 120 which includes a counter unit 121, the output of which is connected to drive the several phase windings driver switches 116. A limit sensor circuit 122 connects the limit switches into the circuit with the demand signal from the source for controlling energization of the motor. The limit sensor circuit 122 is operated to establish a reference for proportionate setting of the valve 1 as well as to deenergize the motor 7 at the fully opened and fully closed limit positions of the valve unit. The limit sensor circuit 122 is connected to the limit switches and establishes a logic output at line 122a connected to a NAND gate 123 of the phase sequencer circuit 120. The step signals from the controller interface circuit 119 are connected to the second input of the gate 123. The controller 118 also generates a binary directional signal at the input 124 of the interface circuit 119 which establishes a forward or open direction logic signal line 124 and a reverse or close directional logic signal line 124a.

The phase sequencer circuit or unit 120 includes a gated, 2-bit, reversible, synchronous counter. Depending on the state of the directional input lines 124 and 124a, the sequencer unit counts in the sequence to step the motor in the desired direction at the "back edge" of each step input signal. If the limit is reached in the current direction of movement, a signal from the direction related limit sensor circuit disables the step input by forcing a logic 0 at one input of the NAND gate 123, thus stopping the count sequence from progressing and effectively holding the motor stationary. The motor can then only be stepped in the opposite direction, or away from the current limit position. An exclusive "OR"

logic system 125 connects the signals lines 124 and 124a to the counter 121 for appropriate directional phase sequencing of the driver switches 116. Assuming a limit control signal has not been generated, the counter 121 sequentially energizes the four switches, with either forward rotation or opposite reverse rotation depending upon the signals appearing at the forward and reverse directional selection lines 124 and 124a.

The repetitive operation of the phase winding switches in the sequence of switch 110a through 110d, provides, for example, forward rotation. Corresponding repetitive energization of the switches in the opposite sequence of 110d through 110a reverses the rotation of the motor and thereby the actuator.

The limit sensor circuit 122 monitors the state of mechanical limit switches and logically combine them with the related direction input to generate logic signals used to stop the motor at each limit and inform the controller of the limit. The separate switch in each direction is required to avoid logical ambiguity that would result otherwise. This allows the limit signal to be generated only when the direction input requests travel into the limit. If this were not done, the motor would reach a limit and remain there in spite of any signals from the controller. The associated logic forms an "and/or/invert" logic function to combine the state of the switch with the proper directional polarity identifying the direction of the input signal.

The limit sensor circuit 122 includes an "open" limit input 126 and a "closed" limit input 127 connected to similar directional logic circuitry shown as an AND-/OR/INVERT logic for generating an output at an output shut-down line 122a. The logic includes NAND gates 128 to combine the limit signals with a corresponding directional logic signal at lines 124 and 124a. NAND gate inverter 130 connect the output of the NAND logic to the phase sequencer 120. When a limit switch is actuated, an appropriate logic "0" signal is impressed to the NAND gate 123 of the phase sequencer 120 which de-energizes the stepping motor and positively prevent energization thereof even in the presence of a continuous continued demand signal for movement in the same direction. This corresponds to the limit position and holds the unit in the limit position. A reverse direction signal is operative to reset the limit circuit and reverse the stepped energization of the stepper motor.

The controller interface thus buffers the direction signals and related step signals from the controller and generates control signals for other circuits.

The power supply unit is energized only if step signals are generated. A step signal monitor 130 includes an exclusive "OR" buffer 131 and a differentiater 131 to detect the leading edge of each step and generate a spike signal which is buffered and shaped by inverter 132. The output of inverter 132 charges a capacitor 133 through diode 134. As long as the charge capacitor 133 exceeds the input threshold of a coupling inverter 135, the inverter will be held with its output low, keeping a motor power supply switch 136 fully on. If step activity ceases, capacitor 133 will slowly discharge eventually causing the inverter 135 to change states and turning on the transistor forcing the power to standby mode. The timing may be set to also provide a pulsed energization of the motor power supply such that power is drawn only during energizing of the motor and thereby minimizing the energy consumption.

Thus the stepper motor is particularly adapted to a positive positioning of the valve or other device with a fail-in position location in either direction and to hold the valve and reverse the stepped energization of the stepper motor.

In addition with the present invention, the unit can be constructed to automatically initalize and control the functioning of the controller. The controller can be programmed to initiate and drive the motor and valve to an initial limit position upon start-up or at other time specified by the controller, such as a periodic basis or otherwise.

A transistor 140 is connected to the output of the sensor gate 129. Resistors 141 and 142 are connected in series with the output of transistor 140 and establishes a quasi-current loop limit signal to the controller. If a valid limit condition exists, the transistor 140 is turned on and sinks current.

The controller may optionally convert this current to a voltage change by providing a pullup resistor, not shown, on the input to its receiver. The controller may use the signal resistor pair formed as a current loop by sensing the current flow via an optoisolator input diode, not shown; this is the preferred mode of operation. The program then moves the valve from that limit position to the alternate limit position. During this initialization sequence, the total steps generated in moving of the valve 1 between the initialized and final limit positions is monitored and recorded by the controller via an output from a suitable counter 138. The total number of steps between such positions establishes the reference for moving of the valve between the fully open and fully closed limit positions. The valve is then repositioned from the last limit position or reinitialized and moved from the initialized position to a position corresponding to a demand signal. The controller monitors the number of steps during such positioning of the valve and records the number in memory and thereby identifies the last position of the valve. A further demand signal provides a directional movement, with the number of steps again either added or substracted from the last number to again identify the new valve position in the processor memory. In this manner, the controller positively and accurately locates the valve. The accuracy is directly related to the construction of the stepper motor and of course the appropriate sequential enerization of the phase windings.

A similar control system can provide for monitoring and control of an A.C. synchronous motor drive system wherein the motor continuously drives the valve positioning unit of the actuator at a constant rate. The time required to move the valve from an initial limit position to the opposite limit position establishes a time reference to the controller for positioning of the valve. The processor is coupled to the drive of the motor with a suitable timing system such as a counter for continuously monitoring the time of moving the valve from the initial position to a first valve setting. Thereafter the microprocessor monitors the bi-directional timed movement of the drive with respect to each previous valve position.

Those skilled in the art will readily recognize the system as a time-based open-loop control for positioning of the valve. The accuracy of the positioning is again directly dependent upon the provision of the appropriate high constant speed motor which rapidly accelerates to establish the desired movement of the valve structure. The combination of a small high-speed constant-speed alternating motor in combination with the speed reduction for positioning of the positioned device permits highly accurate positioning of the valve in response to appropriate demand signals between the referenced limit positions.

Thus the present invention with the use of the highly sensitive and accurate position limit unit produces a highly effective open loop control.

The limit unit of the present invention can of course also be applied to any other suitable control such as a conventional feedback servo system, a manually controlled system and the like.

The present invention provides simple and reliably inexpensive force limit torque assemblies which can be readily applied to various positioned units in HVAC systems having essential limit positions and forces.

Various modes of carrying out the invention are contemplated as being within the scope of the following claims particularly pointing out and distinctly claiming the subject matter which is regarded as the invention.

I claim:

1. A limit switch apparatus for monitoring bi-directional movement of a positioned device between first and second limits and having an electrically operated motor means operable to establish forced movement of the positioned device in excess of the force on the device in moving between said first and second limits whereby the force increases at said first and second limits, comprising a spring means having retainer means movably mounted for stressing said spring means, a switch operator coupled to said retainer means, switch means mounted in the path of said operator, a pivot unit secured to said switch operator and extending axially outwardly of said operator, a pivoted lever coupled to said pivot unit and operable to pivot in opposite directions relative to said switch operator, said pivoted lever being operable to move said pivot support unit relative to said spring means in response to movement at both said limits and thereby actuate said switch means in response to said forced movement at said limits.

2. The limit switch apparatus of claim 1 wherein said pivot unit includes a generally rectangular opening having opposed knife edge portions spaced to receive said lever, said lever being a flatplate like member.

3. The limit switch apparatus of claim 2 wherein said spring means includes an elongated coil spring and said switch operator includes a rod member passing through said spring and being moved against the bias of said coil spring in response to pressurized engagement with the device at said first and second limit positions.

4. The limit switch apparatus of claim 1 wherein the spring means has a low spring rate.

5. The apparatus of claim 1 wherein said pivot unit includes a member having a lateral opening for receiving a substantially flat plate-like lever, said opening being defined by a pair of parallel opposed knife edge units extending across said lever and being spaced slightly in excess of the thickness of said lever to permit relative low friction pivotal movement of said lever.

6. The apparatus of claim 1 wherein said spring means includes a tubular spring housing and a coil spring disposed within said housing, said retainer means including first and second end spring keepers releasably mounted one each in the opposite ends of said housing, such switch operator including a rod member extending through said coil spring and in said keepers and having an enlargements abutting said keepers, said pivot unit including a pair of axially spaced knife-edged head members connected by a center rod connection and forming an opening for receiving of said lever, said lever including a flat bifurcated end located between said head members.

7. The apparatus of claim 6 including at least two switch arms secured to said pivot unit and projecting laterally from said pivot unit, said housing including a pair of spaced walls located to the opposite sides of said switch arms, means securing a switch unit to said first wall, means securing a switch unit to said second wall, said switch units including operating elements projecting from the switch unit toward the switch arms, said switch units being mounted with operating elements aligned with the switch arm, one element engaged by said aligned switch arm and the other element spaced from the aligned switch arm whereby the bi-directional movement of said switch operator is operable to actuate and change the state of one of said switch units.

8. A limit switch assembly for monitoring bi-directional movement between limits and including a prime mover operable to establish a force in excess of the force on the device in moving between said limits, comprising a support structure, a coil spring means secured to said support, retainer means movably mounted to the opposite ends of said coil spring means and compressing said coil spring means, a switch operator mounted for a linear motion within said coil spring means and including means spaced in accordance with the spacing of said retainer means and engaging said retainer means, a pivot support unit secured to said switch operator and extending axially outwardly of said switch operator, said pivot support unit including a pivot opening means extending laterally of said switch operator, said opening means adapted to receive a pivoting lever forming part of a position driven load device whereby said load device is positioned between said limits without movement of said switch operator with respect to said coil spring means and said switch operator being moved against the bias of said coil spring means in response to pressurized engagement with the device to a limit position.

9. The apparatus of claim 8 wherein said pivot opening means includes a lateral opening for receiving a substantially flat plate-like lever, said opening being defined by a pair of parallel opposed knife edge units extending in the direction across said lever and being spaced substantially in accordance with the thickness of said lever.

10. The apparatus of claim 9 wherein said knife edge units are spaced slightly more than the thickness of said lever.

11. The apparatus of claim 8 including at least two laterally spaaced switch arms secured to said pivot unit and projecting from said pivot unit in a common plane, said support unit including a pair of laterally spaced walls located to the opposite sides of and outwardly of said switch arms, a first switch device secured to said first wall in alignment with said first switch arm, a second switch device secured to second wall in alignment with said second switch arm, said switch devices each including an operating element projecting from the aligned switch arm, said switch devices being mounted with one operating element engaged by said aligned switch arm and the other operating element slightly spaced from the aligned switch arm whereby bi-directional movement of said switch operator is operable to actuate and change the state of said switch units.

12. The apparatus of claim 8 wherein said support includes a tubular spring housing open at the opposite ends, said coil spring being disposed within the housing, first and second coil keepers secured to the opposite ends of said housing and holding the coil spring in said housing, each of said keepers having a substantially rectangular opening, such switch operator including a rod member extending through said coil spring and said rectangular openings in said keepers, said rod extending from said first keeper and having an abuttment essentially corresponding to the opening of said keeper to permit passing of the rod through said keeper and rotated to engage the keeper in response to reverse movement of the operator rod, said rod having a guide corresponding essentially in cross section to the opening in the second keeper, said pivot unit abutting said second keeper and including a pair of axially spaced knife-edge pivot members and connected by a center rod connection, and said spaced pivot members defining said opening means for receiving said pivoting lever, said housing includes first and second laterally extending flanges projecting outwardly essentially in the plane of said second keeper for mounting of said housing to a support, first and second switch arms in parallel relation to the opposite side of said housing integrally formed with said housing, switch walls secured to said housing, first and second switches secured one to each of said switch walls and each having operating element projecting from the switch toward said housing, and switch arms secured to the outer end of said pivot unit and extending in opposite directions in a substantailly similar plane and aligning the outer ends of each arm with said operating elements of said switches.

13. A linear valve actuator comprising a support means, a lead screw unit including a lead screw rotating mounted to said support means, said lead screw unit including a follower unit threaded on said lead screw for axial positioning thereon, said follower unit including stop means engaging said support means to prevent rotation of said follower, motor means secured to the support means, a gear reduction means coupling said motor means to said lead screw for rotation thereof and axial positioning of said follower unit, pivot means secured to said followed unit, a lever means pivotal coupled to said pivot means, a coupler unit secured to said support means and including a coupler slidably mounted for movement parallel to said follower, said coupler including pivotal means, a central portion of said lever means coupled to said pivotal means of said coupler, a limit unit secured to said support means opposite the side from said lead screw unit, said limit unit including a spring means, retainer means coupled to said spring means and holding said spring means in a stressed state, a switch operator passing through said retainer means and operable to engage and move said retainer means to further stress said spring means, said switch operator having a pivotal means, and said lever means having an end portion coupled to said pivotal means of said limit unit whereby said lever means pivots in said switch operator with said coupler between said limits and in said coupler at said limits.

14. The valve actuator of claim 13 wherein said coil spring has a low spring rate to rapidly actuate said switch units at said limits.

15. The actuator of claim 13 wherein said pivotal means including a pair of opposed spaced walls defining a lever receiving opening, the axially opposed surfaces of said lever receiving opening having corresponding aligned knife edges.

16. The actuator of claim 13 wherein said support means includes a housing having a base wall for mounting of said actuator to a valve and having an outer wall spaced from said base wall to define a housing of a predetermined heighth and depth, said base wall and top wall being joined by a substantially planar backwall and end walls, said housing having partial front walls secured to the side wall and projecting inwardly for less than a distance equal to one third of the width of said housing and defining first and second pockets to the opposite side of said housing, said lead screw unit located within said first pocket and the limit unit located within said second pocket.

17. The linear valve actuator of claim 13 having an electric drive motor means and connected to said lead screw wherein said lead screw unit and said lever is constructed and arranged to hold a valve in a failed position upon motor failure.

18. The linear valve actuator of claim 13 having an electric drive motor means, a reset spring means connected to said motor means and said lead screw, said reset spring means being stressed by the motor in moving said lever and coupler and operable to reset said coupler and lever in response to deenergization of said motor means.

19. The linear valve operator of claim 13 wherein said follower unit includes an oppositely projecting arm member projecting outwardly from the oposite diametrical sides of said follower unit, said stop means includes at least one of said arm members cooperating with said support to prevent rotation of said follower unit, said pivot means includes said arm members of said follower and being correspondingly constructed, each of said arm members including a pair of axially spaced pivot walls defining a pivot opening with said lever means pivoted therein.

20. The operator of claim 19 wherein inner opposed surfaces of said spaced pivot walls have opposing knife edges, and said lever means includes a bifurcated end telescoped over said follower with the end of the lever located in operative engagement with said knife edges.

21. The operator of claim 13 wherein said load coupler includes oppositely projecting pivot arm members each of which includes a pair of axially spaced kknife-edge walls with the inner opposed surfaces havnng opposed knife edges, said lever means including a slot having a width essentially corresponding to the width of said sliding coupler and a longitudinal length along the length of said lever at least equal to the distance between the opposite outer end of said arms, and said lever means being located over said coupler with the opposite sides of the lever means to the opposite sides of said slots located between the pivot knife-edges of said coupler.

22. The operator of claim 13 wherein said limit unit includes a tubular spring housing having mounting means, said spring means being a coil spring located within said housing, said coil spring having a nominal length greater than the length of said tubular spring housing, spring keepers releasably secured one each in the opposite ends of said spring housing and holding of said spring in a compressed state within said housing, said switch operator passing through said keepers and having a pair of said keeper members located in engagement with the exterior of said keeeers and operable to engage and move said keepers to compress said spring against the opposed keeper, a pivot head integrally secured to said operator, said pivotal means including said pivot head including a pair of opposed spaced walls defining a lever receiving opening, the axially opposed surfaces of said lever opening having corresponding aligned knife edges, connecting wall joining said spaced pivot walls, said lever having a bifurcated end located within said opening and telescoped over said connecting rod member.

23. The actuator of claim 22 including first and second switch plates integrally formed with said mounting means, said plates being located one each to the opposite side of said housing and extending outwardly perpendicular thereof, a first switch unit connected to said first plate and having an operating element projecting axially toward the housing, a second switch unit secured to the second of said plates and having an operating element projecting axially toward said housing, said first and second switch operating elements being located in spaced relation to the opposite sides of said housing, first and second switch operating arms integrally formed with said pivot head and projecting outwardly from said pivot head in alignment respectively with said operating elements of said first and second switch units one of said arms holding the aligned switch actuated and the outer of said arms being aligned with the other operating element and being spaced slightly therefrom and operable to actuate said switch unit by movement of said operator.

24. The actuator of claim 13 wherein said support means includes a housing having a base wall for mounting of said actuator to a valve and having an outer wall spaced from said base wall to define a housing of a predetermined height and width, said base wall and top wall being joined by a substantially planar backwall and end walls, said housing having partial and front walls secured to the side wall and projecting inwardly for less than a distance equal to one third of the width of said housing and defining first and second pockets to the opposite side of said housing.

25. A damper actuator for positioning of a damper having a damper positioning shaft in environmental flow control damper, comprising a support unit adapted to be secured to one edge of the damper and essentially forming a extension of said damper, a motor means mounted within said support, a gear train coupling the output of said motor to said damper positioning shaft, said gear train including a sector gear rotatably mounted within said support on an axis essentially aligned with the axis of said rotating damper element, said sector gear being operable to move said dampers between a fully opened and a fully closed position in response to rotation of said sector with the opposite ends engaging a drive gear of said gear train, said sector gear being rotatable on said shaft, a limit unit secured to a face of said sector gear, said limit unit including a compression spring means, a switch operator moveably mounted within said spring and having a spaced collar member operable to move to compress said spring with said sector gear held fixed, said switch operator including a pivot head with an opening, a lever means secured to said shaft and projecting into said pivot opening for positioning said head and for moving said switch operator, switch means coupled to said spring support with switch operating means mounted in the path of such operator, said switch operator operating to actuate said switch means in response to movement of the switch operator in opposite direction from said spring set location.

26. A positioned controlled device, comprising a positioning coupler adapted to be moved between first and second limits, motor means coupled to position said coupler between said limits, a force limit means coupled to said coupler and operable to generate a limit signal at each limit of said coupler, monitoring means connected to said limit means for recording the driving of said coupler between said limit means and establishing a reference signal identifying the movement of said coupler between said limit means, said reference signal being directly related to the drive characteristic of said motor means in moving of said coupler between said limits whereby the subsequent movement of said coupler is directly related to corresponding characteristic drive of said prime mover, and a demand control operable to provide an energizing signal to said prime mover in accordance with the desired position of said coupler and the corresponding reference for said position.

27. The control system of claim 26 wherein said motor is a stepper motor, said motor means operating to position said coupler between said limit position in accordance with a number of steps, said monitoring means monitoring the number of steps generated in moving said coupler between said limit positions and establishing said number of steps as a control reference, said demand control including a demand signal means generating a number of steps related to the number of steps between at least one of said limit positions and the desired position to thereby correspondingly position said coupler.

28. The control system of claim 26 wherein said moter means is an A.C. synchronus motor operable to position said coupler at a constant velocity, means coupled to said limit means to record the time in which said motor drives said coupler between said limit means and establishing drive signals to said motor to establish time energization of said motor for moving said coupler from said limit position to a desired position in accordance with the proportionate time of said reference signal.

29. A position actuator, a low efficiency lead screw unit having a follower, a motor coupled to said lead screw unit for linear motion of said follower, a valve coupler having a follower mounted in parallel relation to said lead screw follower, an integrated limit unit having a switch operator and mounted to support the switch operator for movement parallel to the valve and lead screw followers, an essentially rigid lever pivotally coupled to both said followers and to said switch operator, said motor moving said followers with said lever pivoting about the switch operator, said lever being pivotal about said valve follower with said valve follower held against movement to move said switch operator for switch operation with a preselected small input movement of the lever.

30. The position actuator of claim 29 including a support housing having said lead screw unit and said limit unit mounted to the opposite ends of said housing and said valve coupler mounted therebetween, said lead screw unit having a shaft means 31. The position actuator of claim 30 including a spiral reset spring unit coupled to said shaft means and operable to reset said lead screw unit and lever upon de-energization of said motor operated drive means.

32. A limit switch apparatus for monitoring bi-directional movement of a positioned device between first and second limits and having a motor means operable to establish forced movement of the positioned device at said limits in excess of the force on the device in moving between said limits whereby the force increases at said first and second limits, comprising a support unit having a spring housing having end stop means, an elongated coil spring means located in said housing and having retainer means, a switch operator coupled to said retainer means and movable axially of said spring means against the force of said spring means, said spring means having a low spring rate whereby said operator is held against movement until the force increases above said limit force and thereafter establishes a substantial movement for a slight change in said force, switch means mounted in the path of said operator, a position operator adapted to be coupled to said motor means and movable in opposite directions to move between said first and second limits, means connecting said position operator to said switch operator and operable to move said switch operator relative to said spring means at both said first limit and at said second limit and thereby actuate said first and second switch means in response to forced movement at said limits.

33. The limit switch apparatus of claim 32 wherein said switch operator includes a rod member passing through said spring means and coupled to the opposite ends of said coil spring means.

34. The apparatus of claim 33 wherein said position operator includes a linear moving member connected to said switch unit or said rod member.

35. The limit switch apparatus of claim 32 wherein the spring means has a spring rate in the range of about 20 to 70 pounds per inch.

36. The apparatus of claim 32 wherein said spring housing is a tubular spring housing having essentially opposite open ends, said housing having end tabs forming said stop means, said retainer means including first and second end spring keepers releasably mounted one each in the opposite ends of said housing, such switch operator including a rod member extending through said coil spring and said keepers and having enlargements abutting said keepers, and said position actuator connected to said rod members.

* * * * *

UNITED STATES PATENT AND TRADEMARK OFFICE
CERTIFICATE OF CORRECTION

PATENT NO. : 4,794,314

DATED : December 27, 1988

INVENTOR(S) : George J. Janu, et al

It is certified that error appears in the above-identified patent and that said Letters Patent is hereby corrected as shown below:

IN THE CLAIMS: Col. 23, line 44, delete "flatplate like" and substitute therefor ---flat plate-like---; Col. 24, line 54, delete "spaaced" and substitute therefor ---spaced---; Col. 24, line 60, after "to" insert ---said---; Col. 25, line 29, after "having" insert ---an---; Col. 25, line 32, delete "substantailly" and substitute therefor ---substantially---; Col. 25, line 45, delete "followed" and substitute therefor ---follower---; Col. 25, line 48, after "follower" insert ---unit---; Col. 25, line 67, delete "including" and substitute therefor ---includes---; Col. 26, line 7, delete "heighth" and substitute therefor ---height---; Col. 26, line 29, delete "an"; Col. 26, line 30, delete "oposite" and substitute therefor ---opposite---; Col. 26, line 46, delete "kknife-" and substitute therefor ---knife---; Col. 26, line 46, delete "havnng" and substitute therefor ---having---; Col. 26, line 67, delete "keeeers" and substitute therefor ---keepers---; Col. 27, line 1, after "keeper," insert ---said pivotal means including---; Col. 27, line 2, delete "said pivotal means including"; Col. 27, line 24, delete "in alignment" and substitute therefor ---and aligned---; Col. 27, line 43, delete "having a damper positioning shaft"; Col. 27, line 44, after "damper" insert ---having a

UNITED STATES PATENT AND TRADEMARK OFFICE
CERTIFICATE OF CORRECTION

PATENT NO. : 4,794,314

DATED : December 27, 1988

INVENTOR(S) : George J. Janu, et al

Page 2 of 2

It is certified that error appears in the above-identified patent and that said Letters Patent is hereby corrected as shown below:

damper positioning shaft----; Col. 27, line 46, delete the first occurrence of "a" and substitute therefor ---an---; Col. 28, line 22, after the first occurrence of "motor" insert ---means---; Col. 28, line 34, delete "moter" and substitute therefor ---motor---; Col. 28, line 61, after "means" insert ---at said end wall, a motor operated drive means, means for mounting said motor operated drive means to said end wall and coupled to position said lead screw unit.---

Signed and Sealed this

Nineteenth Day of December, 1989

Attest:

JEFFREY M. SAMUELS

Attesting Officer     Acting Commissioner of Patents and Trademarks